US012636845B2

(12) United States Patent
Swikoski et al.

(10) Patent No.: US 12,636,845 B2
(45) Date of Patent: May 26, 2026

(54) METHOD AND APPARATUS FOR PRODUCING A VEHICLE INTERIOR COMPONENT

(71) Applicant: LEAR CORPORATION, Southfield, MI (US)

(72) Inventors: Lisa Swikoski, West Bloomfield, MI (US); Michelle A. Brudzynsky, Farmington Hills, MI (US); Ibrahim Valenzuela, Novi, MI (US); Haifeng Liu, Novi, MI (US); Kevin M. Geisler, Menlo Park, CA (US); Jeanene F. Munroe, Southfield, MI (US); David Anderson, Orchard Lake, MI (US); Joshua Hallock, Warren, MI (US); Mark Karges, Macomb, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 18/858,119

(22) PCT Filed: Jun. 22, 2023

(86) PCT No.: PCT/US2023/025923
§ 371 (c)(1),
(2) Date: Oct. 18, 2024

(87) PCT Pub. No.: WO2024/006134
PCT Pub. Date: Jan. 4, 2024

(65) Prior Publication Data
US 2025/0121573 A1     Apr. 17, 2025

Related U.S. Application Data

(60) Provisional application No. 63/503,292, filed on May 19, 2023, provisional application No. 63/356,549, (Continued)

(30) Foreign Application Priority Data

May 26, 2023    (DK) .............................. PA202370255

(51) Int. Cl.
| | |
|---|---|
| *B29D 99/00* | (2010.01) |
| *B60N 2/90* | (2018.01) |
| *B29K 101/12* | (2006.01) |

(52) U.S. Cl.
CPC ......... *B29D 99/0092* (2013.01); *B60N 2/986* (2018.02); *B29K 2101/12* (2013.01)

(58) Field of Classification Search
CPC .......... D04H 3/11; D04H 3/037; B60N 2/986; A47C 27/12; B29D 99/0092; B68G 7/04; B29K 2101/12
See application file for complete search history.

(56) References Cited

U.S. PATENT DOCUMENTS

| | | | |
|---|---|---|---|
| 1,621,008 A | 3/1927 | Fricker |
| 2,130,935 A | 9/1938 | Thompson |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS

Danish First Examination Report for Application No. PA 2023 70255, Dated Aug. 25, 2023, 10 pages.

(Continued)

*Primary Examiner* — Christina A Johnson
*Assistant Examiner* — Kelsey C Grace
(74) *Attorney, Agent, or Firm* — ALSTON & BIRD LLP

(57) ABSTRACT

An apparatus and method for producing a vehicle interior component may include creating a plurality of molten poly- (Continued)

meric filaments, and applying a fluid stream to the molten filaments to impart the desired shape while in a bath to cool them to form a consolidated filament structure. An assembly, system, and method are provided for shaping a plurality of strands of a molten thermoplastic resin as a contoured unitary mesh product via at least one shaping conveyor. Another assembly, system, and method are provided for shaping a plurality of strands of a molten thermoplastic resin as a contoured unitary mesh product via an actuator assembly having one or more actuators.

16 Claims, 8 Drawing Sheets

Related U.S. Application Data filed on Jun. 29, 2022, provisional application No. 63/355,809, filed on Jun. 27, 2022.

(56)                    References Cited

U.S. PATENT DOCUMENTS

| | | | |
|---|---|---|---|
| 2,188,995 A | 2/1940 | Avery et al. |
| 2,630,938 A | 3/1953 | Burnett |
| 2,630,968 A | 3/1953 | Muskat |
| 3,155,363 A | 11/1964 | Lohr |
| 3,309,052 A | 3/1967 | Borisof |
| 3,315,283 A | 4/1967 | Larsen |
| 3,630,572 A | 12/1971 | Homier |
| 3,689,620 A | 9/1972 | Toshio et al. |
| 3,733,658 A | 5/1973 | Mitchell |
| 3,794,378 A | 2/1974 | Haslam et al. |
| D239,147 S | 3/1976 | Karlsen |
| 3,961,823 A | 6/1976 | Caudill, Jr. |
| 4,031,579 A | 6/1977 | Larned |
| 4,287,657 A | 9/1981 | Andre et al. |
| 4,396,823 A | 8/1983 | Nihei et al. |
| 4,476,594 A | 10/1984 | McLeod |
| 4,563,387 A | 1/1986 | Takagi et al. |
| 4,663,211 A | 5/1987 | Kon |
| 4,729,422 A * | 3/1988 | Ernst ..................... B22D 11/115 |
| | | 164/468 |
| 4,751,029 A | 6/1988 | Swanson |
| 4,859,516 A | 8/1989 | Yamanaka et al. |
| 4,860,402 A | 8/1989 | Dichtel |
| 4,876,135 A | 10/1989 | McIntosh |
| 4,881,997 A | 11/1989 | Hatch |
| 4,900,377 A | 2/1990 | Redford et al. |
| 4,913,757 A | 4/1990 | Yamanaka et al. |
| 4,933,224 A | 6/1990 | Hatch |
| 4,952,265 A | 8/1990 | Yamanaka et al. |
| 4,953,770 A | 9/1990 | Bond, Sr. |
| 5,003,664 A | 4/1991 | Wong |
| 5,007,676 A | 4/1991 | Lien |
| 5,016,941 A | 5/1991 | Yokota |
| 5,092,381 A | 3/1992 | Feijen et al. |
| 5,095,592 A | 3/1992 | Doerfling |
| 5,313,034 A | 5/1994 | Grimm et al. |
| 5,378,296 A | 1/1995 | Vesa |
| 5,381,922 A | 1/1995 | Gladman et al. |
| 5,405,178 A | 4/1995 | Weingartner et al. |
| D364,269 S | 11/1995 | Sabosky |
| 5,464,491 A | 11/1995 | Yamanaka |
| 5,482,665 A | 1/1996 | Gill |
| 5,492,662 A | 2/1996 | Kargol et al. |
| 5,494,627 A | 2/1996 | Kargol et al. |
| 5,536,341 A | 7/1996 | Kelman |
| 5,551,755 A | 9/1996 | Lindberg |
| 5,569,641 A | 10/1996 | Smith |
| 5,586,807 A | 12/1996 | Taggart |
| 5,587,121 A | 12/1996 | Vesa |
| 5,620,759 A | 4/1997 | Insley et al. |
| 5,622,262 A | 4/1997 | Sadow |

| | | | |
|---|---|---|---|
| 5,639,543 A | 6/1997 | Isoda et al. |
| 5,669,129 A | 9/1997 | Smith et al. |
| 5,669,799 A | 9/1997 | Moseneder et al. |
| 5,679,296 A | 10/1997 | Kelman et al. |
| 5,733,825 A | 3/1998 | Martin et al. |
| 5,788,332 A | 8/1998 | Hettinga |
| 5,811,186 A | 9/1998 | Martin et al. |
| 5,819,408 A | 10/1998 | Catlin |
| 5,833,321 A | 11/1998 | Kim et al. |
| 5,966,783 A | 10/1999 | Genereux et al. |
| 6,057,024 A | 5/2000 | Mleziva et al. |
| 6,063,317 A | 5/2000 | Carroll, III |
| 6,131,220 A | 10/2000 | Morimura |
| 6,272,707 B1 | 8/2001 | Robrecht et al. |
| 6,283,552 B1 | 9/2001 | Halse et al. |
| 6,302,487 B1 | 10/2001 | Fujita et al. |
| 6,347,790 B1 | 2/2002 | Nishibori et al. |
| 6,378,150 B1 * | 4/2002 | Minegishi ................ D04H 3/16 |
| | | 5/652 |
| D461,746 S | 8/2002 | Olson et al. |
| 6,457,218 B1 | 10/2002 | Lawrence |
| 6,558,590 B1 | 5/2003 | Stewart |
| 6,668,429 B2 | 12/2003 | Fujisawa et al. |
| 6,766,201 B2 | 7/2004 | Von Arx et al. |
| 6,776,201 B2 | 8/2004 | Willis |
| 6,918,146 B2 | 7/2005 | England |
| D523,330 S | 6/2006 | Mattesky |
| 7,073,230 B2 | 7/2006 | Boville |
| 7,100,978 B2 | 9/2006 | Ekern et al. |
| D530,192 S | 10/2006 | Becerra |
| 7,128,371 B2 | 10/2006 | Kawasaki et al. |
| 7,141,768 B2 | 11/2006 | Malofsky et al. |
| 7,158,968 B2 | 1/2007 | Cardno |
| D538,704 S | 3/2007 | Kaminski |
| 7,290,300 B1 | 11/2007 | Khambete |
| 7,377,762 B2 | 5/2008 | Nishibori et al. |
| 7,427,103 B2 | 9/2008 | Weber |
| 7,481,489 B2 | 1/2009 | Demick |
| 7,506,939 B2 | 3/2009 | Brockschneider et al. |
| 7,547,061 B2 | 6/2009 | Horimatsu et al. |
| 7,549,707 B2 | 6/2009 | Brennan et al. |
| 7,622,179 B2 | 11/2009 | Patel et al. |
| 7,625,629 B2 | 12/2009 | Takaoka et al. |
| 7,669,925 B2 | 3/2010 | Beck et al. |
| 7,707,743 B2 | 5/2010 | Schindler et al. |
| 7,771,375 B2 | 8/2010 | Nishibori et al. |
| 7,837,263 B2 | 11/2010 | Booth et al. |
| 7,892,991 B2 | 2/2011 | Yamanaka et al. |
| D636,293 S | 4/2011 | Dolce et al. |
| 7,946,649 B2 | 5/2011 | Galbreath et al. |
| 7,993,734 B2 | 8/2011 | Takaoka et al. |
| 8,052,212 B2 | 11/2011 | Backendorf |
| 8,056,263 B2 | 11/2011 | Schindler et al. |
| 8,226,882 B2 | 7/2012 | Takaoka |
| 8,240,759 B2 | 8/2012 | Hobl et al. |
| 8,276,235 B2 | 10/2012 | Naughton |
| 8,277,210 B2 | 10/2012 | Takaoka |
| D677,193 S | 3/2013 | MacDonald |
| 8,563,121 B2 | 10/2013 | Takaoka |
| 8,563,123 B2 | 10/2013 | Takaoka |
| 8,568,635 B2 | 10/2013 | Takaoka |
| 8,721,825 B2 | 5/2014 | Takaoka |
| 8,752,902 B2 | 6/2014 | Labish |
| 8,757,996 B2 | 6/2014 | Takaoka |
| 8,828,293 B2 | 9/2014 | Takaoka |
| 8,882,202 B2 | 11/2014 | Petzel et al. |
| 8,932,692 B2 | 1/2015 | Pearce |
| 9,004,591 B2 | 4/2015 | Murasaki et al. |
| 9,097,921 B2 | 8/2015 | Ogasawara et al. |
| 9,168,854 B2 | 10/2015 | Ursino et al. |
| 9,169,585 B2 | 10/2015 | Takaoka |
| 9,174,404 B2 | 11/2015 | Takaoka |
| 9,179,748 B2 | 11/2015 | Esti |
| 9,194,066 B2 | 11/2015 | Takaoka |
| 9,283,875 B1 | 3/2016 | Pellettiere |
| 9,334,593 B2 | 5/2016 | Sasaki |
| 9,434,286 B2 | 9/2016 | Klusmeier et al. |
| 9,440,390 B2 | 9/2016 | Takaoka |
| 9,447,522 B2 | 9/2016 | Zikeli et al. |

(56) References Cited

U.S. PATENT DOCUMENTS

| 9,456,702 | B2 | 10/2016 | Miyata et al. |
| 9,528,209 | B2 | 12/2016 | Takaoka |
| 9,561,612 | B2 | 2/2017 | Takaoka |
| 9,598,803 | B2 | 3/2017 | Takaoka |
| 9,615,670 | B2 | 4/2017 | Takaoka |
| 9,616,790 | B2 | 4/2017 | Stankiewicz et al. |
| 9,617,021 | B2 | 4/2017 | McCorkle et al. |
| 9,669,744 | B2 | 6/2017 | Cao et al. |
| 9,688,007 | B2 | 6/2017 | Cheng |
| 9,708,067 | B2 | 7/2017 | Wilson et al. |
| 9,751,442 | B2 | 9/2017 | Smith |
| 9,771,174 | B2 | 9/2017 | Murray |
| D798,875 | S | 10/2017 | Huang |
| 9,789,796 | B1 | 10/2017 | White |
| 9,809,137 | B2 | 11/2017 | Kheil |
| 9,918,559 | B2 | 3/2018 | Osaki |
| 9,918,560 | B2 | 3/2018 | Osaki |
| 9,925,899 | B2 | 3/2018 | Mogi et al. |
| 9,938,649 | B2 | 4/2018 | Taninaka et al. |
| 9,970,140 | B2 | 5/2018 | Taninaka et al. |
| 10,118,323 | B2 | 11/2018 | Fujita et al. |
| 10,150,320 | B2 | 12/2018 | Ellringmann et al. |
| 10,231,511 | B2 | 3/2019 | Guyan et al. |
| 10,233,073 | B2 | 3/2019 | Takaoka |
| 10,266,977 | B2 | 4/2019 | Takaoka |
| 10,316,444 | B2 | 6/2019 | Wakui et al. |
| 10,328,618 | B2 | 6/2019 | Takaoka |
| 10,343,565 | B2 | 7/2019 | Baek et al. |
| 10,398,236 | B2 | 9/2019 | Achten et al. |
| 10,399,848 | B2 | 9/2019 | Kristo et al. |
| 10,414,305 | B2 | 9/2019 | Ishii et al. |
| 10,421,414 | B2 | 9/2019 | Townley et al. |
| 10,501,598 | B2 | 12/2019 | Baldwin et al. |
| 10,604,040 | B2 | 3/2020 | Clauser et al. |
| 10,618,799 | B2 | 4/2020 | Shah et al. |
| 10,730,419 | B2 | 8/2020 | Low et al. |
| 10,736,435 | B2 | 8/2020 | Duncan et al. |
| 10,744,914 | B2 | 8/2020 | Baek et al. |
| 10,750,820 | B2 | 8/2020 | Guyan et al. |
| RE48,225 | E | 9/2020 | Kheil et al. |
| 10,780,805 | B2 | 9/2020 | Kamata |
| 10,806,272 | B2 | 10/2020 | Ando et al. |
| 10,821,862 | B2 | 11/2020 | Russman et al. |
| 10,843,600 | B2 | 11/2020 | Booth et al. |
| 10,882,444 | B2 | 1/2021 | Townley et al. |
| 10,889,071 | B2 | 1/2021 | Kojima et al. |
| 10,934,644 | B2 | 3/2021 | Taninaka et al. |
| 11,007,761 | B2 | 5/2021 | Ben-Daat et al. |
| 11,168,421 | B2 | 11/2021 | Wakui et al. |
| 11,186,336 | B2 | 11/2021 | Primeaux et al. |
| D948,764 | S | 4/2022 | Peterson |
| 11,369,532 | B2 | 6/2022 | Wilson et al. |
| 11,383,625 | B2 | 7/2022 | Voigt et al. |
| 11,554,699 | B2 | 1/2023 | Liau et al. |
| D1,005,380 | S | 11/2023 | McWilliams et al. |
| 2002/0101109 | A1 | 8/2002 | Stiller et al. |
| 2002/0193221 | A1 | 12/2002 | Tisi et al. |
| 2003/0026970 | A1 | 2/2003 | Hernandez et al. |
| 2003/0032731 | A1 | 2/2003 | Oswald et al. |
| 2003/0061663 | A1 | 4/2003 | Lampel |
| 2003/0092335 | A1 | 5/2003 | Takaoka |
| 2004/0036326 | A1 | 2/2004 | Bajic et al. |
| 2004/0099981 | A1 | 5/2004 | Gerking |
| 2004/0126577 | A1 | 7/2004 | Lee et al. |
| 2004/0142619 | A1 | 7/2004 | Ueno et al. |
| 2004/0255385 | A1 | 12/2004 | England |
| 2005/0030011 | A1 | 2/2005 | Shimizu et al. |
| 2005/0066423 | A1 | 3/2005 | Hogan |
| 2005/0198874 | A1 | 9/2005 | Wurm |
| 2005/0238842 | A1 | 10/2005 | Schindzielorz et al. |
| 2006/0068120 | A1 | 3/2006 | Sreenivasan et al. |
| 2006/0075615 | A1 | 4/2006 | Khambete |
| 2006/0116045 | A1 | 6/2006 | Nishibori et al. |
| 2006/0198983 | A1 | 9/2006 | Patel et al. |
| 2006/0237986 | A1 | 10/2006 | Brockschneider et al. |
| 2007/0001336 | A1 | 1/2007 | Nishibori et al. |
| 2007/0057414 | A1 | 3/2007 | Hartge |
| 2007/0066197 | A1 | 3/2007 | Woo et al. |
| 2007/0134464 | A1 | 6/2007 | Schindzielorz et al. |
| 2007/0207691 | A1 | 9/2007 | Cobbett Wiles et al. |
| 2008/0099458 | A1 | 5/2008 | Hilmer |
| 2008/0102149 | A1 | 5/2008 | Williams |
| 2008/0203615 | A1 | 8/2008 | Brum |
| 2008/0252111 | A1 | 10/2008 | Rothkop et al. |
| 2008/0254281 | A1 | 10/2008 | Chen et al. |
| 2008/0309143 | A1 | 12/2008 | Booth et al. |
| 2009/0008377 | A1 | 1/2009 | Nathan et al. |
| 2009/0108494 | A1 | 4/2009 | Ito et al. |
| 2009/0152909 | A1 | 6/2009 | Andersson et al. |
| 2009/0269570 | A1 | 10/2009 | Takaoka |
| 2009/0269571 | A1 | 10/2009 | Takaoka et al. |
| 2010/0181796 | A1 | 7/2010 | Galbreath et al. |
| 2010/0258334 | A1 | 10/2010 | Akaike et al. |
| 2011/0252568 | A1 | 10/2011 | Ramp |
| 2011/0278902 | A1 | 11/2011 | Galbreath et al. |
| 2011/0316185 | A1 | 12/2011 | Takaoka et al. |
| 2012/0042452 | A1 | 2/2012 | Takaoka et al. |
| 2012/0104646 | A1 | 5/2012 | Takaoka |
| 2012/0112515 | A1 | 5/2012 | Labish |
| 2012/0174352 | A1 | 7/2012 | Tsunoda |
| 2012/0180939 | A1 | 7/2012 | Takaoka |
| 2012/0181841 | A1 | 7/2012 | Petzel et al. |
| 2012/0301701 | A1 | 11/2012 | Takaoka et al. |
| 2012/0319323 | A1 | 12/2012 | Takaoka |
| 2012/0328722 | A1 | 12/2012 | Takaoka |
| 2013/0000043 | A1 | 1/2013 | Bullard et al. |
| 2013/0020016 | A1 | 1/2013 | Takaoka |
| 2013/0137330 | A1 | 5/2013 | Grimm |
| 2013/0161858 | A1 | 6/2013 | Sasaki |
| 2013/0164123 | A1 | 6/2013 | Helmenstein |
| 2013/0189472 | A1 | 7/2013 | Takaoka |
| 2013/0200661 | A1 | 8/2013 | Klusmeier et al. |
| 2014/0029900 | A1 | 1/2014 | Logan, Jr. et al. |
| 2014/0035191 | A1 | 2/2014 | Takaoka |
| 2014/0037907 | A1 | 2/2014 | Takaoka |
| 2014/0037908 | A1 | 2/2014 | Takaoka |
| 2014/0042792 | A1 | 2/2014 | Kajiwara |
| 2014/0062161 | A1 | 3/2014 | Elenbaas et al. |
| 2014/0138016 | A1 | 5/2014 | Takaoka et al. |
| 2014/0167328 | A1 | 6/2014 | Petzel |
| 2014/0354029 | A1 | 12/2014 | Petzel et al. |
| 2014/0370769 | A1 | 12/2014 | Osaki |
| 2014/0378015 | A1 | 12/2014 | Osaki |
| 2015/0072107 | A1 | 3/2015 | Fujita et al. |
| 2015/0091209 | A1 | 4/2015 | Mueller et al. |
| 2015/0197056 | A1 | 7/2015 | Takaoka |
| 2015/0210192 | A1 | 7/2015 | Benson et al. |
| 2015/0219136 | A1 | 8/2015 | Koelling |
| 2015/0266263 | A1 | 9/2015 | Ichikawa |
| 2015/0272332 | A1 | 10/2015 | Noguchi et al. |
| 2015/0274048 | A1 | 10/2015 | Mogi et al. |
| 2015/0284894 | A1 | 10/2015 | Takaoka |
| 2015/0367583 | A1 | 12/2015 | Blot et al. |
| 2016/0009209 | A1 | 1/2016 | Cao et al. |
| 2016/0010250 | A1 | 1/2016 | Taninaka et al. |
| 2016/0023387 | A1 | 1/2016 | Takaoka et al. |
| 2016/0032506 | A1 | 2/2016 | Takaoka |
| 2016/0051009 | A1 | 2/2016 | Kormann et al. |
| 2016/0052433 | A1 | 2/2016 | Ono et al. |
| 2016/0052435 | A1 | 2/2016 | Nakada |
| 2016/0096462 | A1 | 4/2016 | Kromm et al. |
| 2016/0122925 | A1 | 5/2016 | Shah et al. |
| 2016/0144756 | A1 | 5/2016 | Ito et al. |
| 2016/0157628 | A1 | 6/2016 | Khambete et al. |
| 2016/0174725 | A1 | 6/2016 | Takaoka et al. |
| 2016/0263802 | A1 | 9/2016 | Takaoka |
| 2016/0318428 | A1 | 11/2016 | Hugues |
| 2016/0374428 | A1 | 12/2016 | Kormann et al. |
| 2017/0043695 | A1 | 2/2017 | Kitamoto et al. |
| 2017/0174346 | A1 | 6/2017 | Wilson et al. |
| 2017/0181505 | A1 | 6/2017 | Burke et al. |
| 2017/0184108 | A1 | 6/2017 | Scancarello et al. |
| 2017/0332733 | A1 | 11/2017 | Cluskers et al. |
| 2018/0054858 | A1 | 2/2018 | Dry |

(56)  References Cited

U.S. PATENT DOCUMENTS

| | | |
|---|---|---|
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0148312 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori et al. |
| 2019/0232835 A1 | 8/2019 | Murakami et al. |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0231428 A1 | 7/2020 | Migneco et al. |
| 2020/0262323 A1 | 8/2020 | Robinson et al. |
| 2020/0315365 A1 | 10/2020 | Kondo et al. |
| 2020/0332445 A1 | 10/2020 | Taninaka et al. |
| 2020/0360210 A1 | 11/2020 | Zoni, III et al. |
| 2021/0024155 A1 | 1/2021 | Primeaux et al. |
| 2021/0046731 A1 | 2/2021 | Nishikawa et al. |
| 2021/0054549 A1 | 2/2021 | Takaoka |
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0188138 A1 | 6/2021 | Powell et al. |
| 2021/0221266 A1 | 7/2021 | Kozlowski et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |
| 2022/0169554 A1 | 6/2022 | Du Moulinet et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322136 A1 | 10/2023 | Wang et al. |

FOREIGN PATENT DOCUMENTS

| | | |
|---|---|---|
| BR | 112014004632 A2 | 3/2017 |
| BR | 112017016357 A2 | 3/2018 |
| BR | 112013020474 A2 | 3/2021 |
| BR | 112014001603 A2 | 8/2021 |
| CA | 3102262 A1 | 12/2019 |
| CN | 100467696 C | 3/2009 |
| CN | 1859862 B | 4/2010 |
| CN | 202509164 U | 10/2012 |
| CN | 104080959 A | 10/2014 |
| CN | 105026632 A | 11/2015 |
| CN | 102959151 B | 4/2016 |
| CN | 105612279 A | 5/2016 |
| CN | 103328711 B | 6/2016 |
| CN | 105683434 A | 6/2016 |
| CN | 104024511 B | 8/2016 |
| CN | 104582538 B | 9/2016 |
| CN | 106387295 A | 2/2017 |
| CN | 103998668 B | 3/2017 |
| CN | 103827376 B | 6/2017 |
| CN | 104285003 B | 9/2017 |
| CN | 107208339 A | 9/2017 |
| CN | 107208340 A | 9/2017 |
| CN | 105705695 B | 1/2018 |
| CN | 107532357 A | 1/2018 |
| CN | 107614238 A | 1/2018 |
| CN | 107708493 A | 2/2018 |
| CN | 207140883 U | 3/2018 |
| CN | 208484779 U | 2/2019 |
| CN | 109552123 A | 4/2019 |
| CN | 109680412 A | 4/2019 |
| CN | 110316033 A | 10/2019 |
| CN | 106231959 B | 10/2020 |
| CN | 111989430 A | 11/2020 |
| CN | 112020578 A | 12/2020 |
| CN | 113166995 A | 7/2021 |
| CN | 213618701 U | 7/2021 |
| CN | 215203369 U | 12/2021 |
| CN | 113930900 A | 1/2022 |
| CN | 109680413 B | 3/2022 |
| CN | 115139881 A | 10/2022 |
| DE | 2626748 A1 | 12/1977 |
| DE | 3127303 A1 | 1/1983 |
| DE | 3037834 C2 | 5/1987 |
| DE | 3690196 C1 | 10/1989 |
| DE | 29822649 U1 | 4/1999 |
| DE | 20100848 U1 | 3/2001 |
| DE | 102004053133 A1 | 5/2006 |
| DE | 202006017670 U1 | 7/2007 |
| DE | 102006020306 A1 | 11/2007 |
| DE | 102008033468 A1 | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102022107559 A1 | 10/2022 |
| DK | 1832675 T3 | 6/2013 |
| DK | 2772576 T3 | 5/2015 |
| DK | 3255192 T2 | 3/2020 |
| DK | 202370025 A1 | 2/2024 |
| DK | 202370426 A1 | 8/2024 |
| EP | 0145603 A2 | 6/1985 |
| EP | 0240388 A2 | 10/1987 |
| EP | 0370991 A2 | 5/1990 |
| EP | 0392568 A1 | 10/1990 |
| EP | 0805064 A2 | 11/1997 |
| EP | 0890430 A2 | 1/1999 |
| EP | 0894885 A2 | 2/1999 |
| EP | 0926302 A2 | 6/1999 |
| EP | 1270787 A1 | 1/2003 |
| EP | 1586687 A1 | 10/2005 |
| EP | 1683446 A1 | 7/2006 |
| EP | 1832675 A1 | 9/2007 |
| EP | 1858944 A2 | 11/2007 |
| EP | 2230132 A1 | 9/2010 |
| EP | 2489770 A1 | 8/2012 |
| EP | 2532502 A1 | 12/2012 |
| EP | 2565304 A1 | 3/2013 |
| EP | 2653598 A1 | 10/2013 |
| EP | 2751312 A1 | 7/2014 |
| EP | 2772576 A1 | 9/2014 |
| EP | 2774807 A2 | 9/2014 |
| EP | 2792775 A1 | 10/2014 |
| EP | 2792776 A1 | 10/2014 |
| EP | 2848721 A1 | 3/2015 |
| EP | 2894246 A1 | 7/2015 |
| EP | 2966206 A1 | 1/2016 |
| EP | 3064627 A1 | 9/2016 |
| EP | 3064628 A1 | 9/2016 |
| EP | 3210487 A1 | 8/2017 |
| EP | 3255192 A1 | 12/2017 |
| EP | 3256632 A1 | 12/2017 |
| EP | 3305500 A1 | 4/2018 |
| EP | 3610760 A1 | 2/2020 |
| EP | 3779017 A1 | 2/2021 |
| EP | 3826820 A1 | 6/2021 |
| EP | 3889332 A1 | 10/2021 |
| EP | 3974572 A1 | 3/2022 |
| ES | 2335962 A1 | 4/2010 |
| ES | 2346180 T3 | 10/2010 |

(56)  References Cited

FOREIGN PATENT DOCUMENTS

| | | | |
|---|---|---|---|
| FR | 2432108 | A1 | 2/1980 |
| FR | 2596626 | A1 | 10/1987 |
| FR | 2675440 | A1 | 10/1992 |
| FR | 2850260 | A1 | 7/2004 |
| FR | 3050409 | A1 | 10/2017 |
| FR | 3063461 | A1 | 9/2018 |
| FR | 3109753 | A1 | 11/2021 |
| GB | 721866 | A | 1/1955 |
| GB | 1009799 | A | 11/1965 |
| GB | 2275695 | A | 9/1994 |
| GB | 2576141 | A | 2/2020 |
| GB | 2577591 | A | 4/2020 |
| GB | 2589497 | A | 6/2021 |
| GB | 2628886 | A | 10/2024 |
| IN | 201717042989 | A | 3/2018 |
| IN | 336480 | B | 5/2020 |
| IN | 202047045846 | A | 10/2020 |
| IN | 351780 | B | 11/2020 |
| IN | 382056 | B | 11/2021 |
| IN | 202117027707 | A | 11/2021 |
| JP | S556515 | A | 1/1980 |
| JP | S5517527 | A | 2/1980 |
| JP | H04286627 | A | 10/1992 |
| JP | H07300760 | A | 11/1995 |
| JP | H0861414 | A | 3/1996 |
| JP | H1046185 | A | 2/1998 |
| JP | H115282 | A | 1/1999 |
| JP | H11350326 | A | 12/1999 |
| JP | 2000004993 | A | 1/2000 |
| JP | 2001046185 | A | 2/2001 |
| JP | 2001055719 | A | 2/2001 |
| JP | 2001061612 | A | 3/2001 |
| JP | 2001070106 | A | 3/2001 |
| JP | 2001310378 | A | 11/2001 |
| JP | 2001329631 | A | 11/2001 |
| JP | 2002084894 | A | 3/2002 |
| JP | 2002087879 | A | 3/2002 |
| JP | 2002088636 | A | 3/2002 |
| JP | 2003250667 | A | 9/2003 |
| JP | 2003251089 | A | 9/2003 |
| JP | 2003268668 | A | 9/2003 |
| JP | 2004202858 | A | 7/2004 |
| JP | 3686690 | B2 | 8/2005 |
| JP | 3686692 | B2 | 8/2005 |
| JP | 2006006924 | A | 1/2006 |
| JP | 2006200117 | A | 8/2006 |
| JP | 2006200119 | A | 8/2006 |
| JP | 2006200120 | A | 8/2006 |
| JP | 2007098013 | A | 4/2007 |
| JP | 4181878 | B2 | 11/2008 |
| JP | 2009090089 | A | 4/2009 |
| JP | 4350285 | B2 | 10/2009 |
| JP | 4350286 | B2 | 10/2009 |
| JP | 4350287 | B2 | 10/2009 |
| JP | 2011045424 | A | 3/2011 |
| JP | 2011152779 | A | 8/2011 |
| JP | 2011177413 | A | 9/2011 |
| JP | 4835150 | B2 | 12/2011 |
| JP | 2012115515 | A | 6/2012 |
| JP | 5165809 | B1 | 3/2013 |
| JP | 2013091862 | A | 5/2013 |
| JP | 5339107 | B1 | 11/2013 |
| JP | 5418741 | B1 | 2/2014 |
| JP | 2014038151 | A | 2/2014 |
| JP | 5454733 | B1 | 3/2014 |
| JP | 5454734 | B1 | 3/2014 |
| JP | 2014064767 | A | 4/2014 |
| JP | 5532178 | B1 | 6/2014 |
| JP | 5532179 | B1 | 6/2014 |
| JP | 2014104050 | A | 6/2014 |
| JP | 5569641 | B1 | 8/2014 |
| JP | 2015205611 | A | 11/2015 |
| JP | 5868964 | B2 | 2/2016 |
| JP | 2016028900 | A | 3/2016 |
| JP | 5909581 | B1 | 4/2016 |
| JP | 5976511 | B2 | 8/2016 |
| JP | 5986584 | B2 | 9/2016 |
| JP | 5990194 | B2 | 9/2016 |
| JP | 2016189879 | A | 11/2016 |
| JP | 6182249 | B2 | 8/2017 |
| JP | 2017150100 | A | 8/2017 |
| JP | 6228278 | B2 | 11/2017 |
| JP | 6294140 | B2 | 3/2018 |
| JP | 6311918 | B2 | 4/2018 |
| JP | 6311919 | B2 | 4/2018 |
| JP | 6318643 | B2 | 5/2018 |
| JP | 6347492 | B2 | 6/2018 |
| JP | 6527602 | B2 | 6/2019 |
| JP | 6566900 | B2 | 8/2019 |
| JP | 2019173217 | A | 10/2019 |
| JP | 2019173218 | A | 10/2019 |
| JP | 2019189972 | A | 10/2019 |
| JP | 2019210565 | A | 12/2019 |
| JP | 6661666 | B2 | 3/2020 |
| JP | 2020045589 | A | 3/2020 |
| JP | 2020090648 | A | 6/2020 |
| JP | 6725823 | B2 | 7/2020 |
| JP | 2020127523 | A | 8/2020 |
| JP | 2020156629 | A | 10/2020 |
| JP | 6786500 | B2 | 11/2020 |
| JP | 2020192164 | A | 12/2020 |
| JP | 6819297 | B2 | 1/2021 |
| JP | 2021045365 | A | 3/2021 |
| JP | 6863537 | B2 | 4/2021 |
| JP | 6909823 | B2 | 7/2021 |
| JP | 7002010 | B2 | 2/2022 |
| JP | 7158968 | B2 | 10/2022 |
| KP | 4907991 | B2 | 4/2012 |
| KR | 200207612 | Y1 | 1/2001 |
| KR | 101141773 | B1 | 5/2012 |
| KR | 101250622 | B1 | 4/2013 |
| KR | 20130067823 | A | 6/2013 |
| KR | 20170017488 | A | 2/2017 |
| KR | 101717488 | B1 | 3/2017 |
| KR | 101722929 | B1 | 4/2017 |
| KR | 101722932 | B1 | 4/2017 |
| KR | 20170107554 | A | 9/2017 |
| KR | 20170117085 | A | 10/2017 |
| KR | 101829235 | B1 | 2/2018 |
| KR | 101928730 | B1 | 3/2019 |
| KR | 101961514 | B1 | 3/2019 |
| KR | 101983204 | B1 | 5/2019 |
| KR | 102002393 | B1 | 7/2019 |
| KR | 102083055 | B1 | 2/2020 |
| KR | 102137446 | B1 | 7/2020 |
| KR | 102148214 | B1 | 8/2020 |
| KR | 102227060 | B1 | 3/2021 |
| KR | 20210076130 | A | 6/2021 |
| NL | 1032699 | C2 | 4/2008 |
| WO | 1992018224 | A1 | 10/1992 |
| WO | 1995015768 | A1 | 6/1995 |
| WO | 1997002377 | A1 | 1/1997 |
| WO | 2000047801 | A1 | 8/2000 |
| WO | 2000071382 | A1 | 11/2000 |
| WO | 2001068967 | A1 | 9/2001 |
| WO | 2002061217 | A1 | 8/2002 |
| WO | 2004014690 | A1 | 2/2004 |
| WO | 2004063450 | A1 | 7/2004 |
| WO | 2006068120 | A1 | 6/2006 |
| WO | 2005030011 | A1 | 12/2006 |
| WO | 2009092153 | A1 | 7/2009 |
| WO | 2010068854 | A1 | 6/2010 |
| WO | 2011102951 | A1 | 8/2011 |
| WO | 2012035736 | A1 | 3/2012 |
| WO | 2010090093 | A1 | 8/2012 |
| WO | 2012157289 | A1 | 11/2012 |
| WO | 2013030400 | A1 | 3/2013 |
| WO | 2013088736 | A1 | 6/2013 |
| WO | 2013088737 | A1 | 6/2013 |
| WO | 2013168699 | A1 | 11/2013 |
| WO | 2014038151 | A1 | 3/2014 |
| WO | 2014080614 | A1 | 5/2014 |
| WO | 2014132484 | A1 | 9/2014 |
| WO | 2015050134 | A1 | 4/2015 |

(56) References Cited

FOREIGN PATENT DOCUMENTS

| | | | |
|---|---|---|---|
| WO | 2015064523 | A1 | 5/2015 |
| WO | 2015064557 | A1 | 5/2015 |
| WO | 2015163188 | A1 | 10/2015 |
| WO | 2016125766 | A1 | 8/2016 |
| WO | 2016130602 | A1 | 8/2016 |
| WO | 2016177425 | A1 | 11/2016 |
| WO | 2016189879 | A1 | 3/2018 |
| WO | 2018068451 | A1 | 4/2018 |
| WO | 2017122370 | A1 | 8/2018 |
| WO | 2017119157 | A1 | 9/2018 |
| WO | 2017199474 | A1 | 2/2019 |
| WO | 2019036559 | A1 | 2/2019 |
| WO | 2019188090 | A1 | 10/2019 |
| WO | 2019230304 | A1 | 12/2019 |
| WO | 2020021263 | A1 | 1/2020 |
| WO | 2020116327 | A1 | 6/2020 |
| WO | 2020245670 | A1 | 12/2020 |
| WO | 2020111110 | A1 | 4/2021 |
| WO | 2021074601 | A1 | 4/2021 |
| WO | 2021122937 | A1 | 6/2021 |
| WO | 2021141601 | A1 | 7/2021 |
| WO | 2020045589 | A1 | 8/2021 |
| WO | 2020090648 | A1 | 10/2021 |
| WO | 2022097435 | A1 | 5/2022 |
| WO | 2023101995 | A1 | 6/2023 |
| WO | 2023122018 | A2 | 6/2023 |
| WO | 2023172483 | A1 | 9/2023 |
| WO | 2023204905 | A1 | 10/2023 |
| WO | 2023220261 | A1 | 11/2023 |
| WO | 2023244721 | A1 | 12/2023 |
| WO | 2023250026 | A1 | 12/2023 |
| WO | 2024006134 | A1 | 1/2024 |
| WO | 2024006143 | A1 | 1/2024 |
| WO | 2024097012 | A1 | 5/2024 |
| WO | 2024136943 | 1 | 5/2024 |

OTHER PUBLICATIONS

Danish Second Examination Report for Application No. PA 2023 70255, Dated Nov. 28, 2023, 3 pages.
Danish Third Examination Report for Application No. PA 2023 70255, Dated Apr. 8, 2024, 3 pages.
Danish Fourth Examination Report and Approval for Grant for Application No. PA 2023 70255, Dated Jul. 22, 2024, 2 pages.
airstring.com, About Airstring, Jan. 18, 2021, 13 pages.
http://airstring.com, Introducing Airstring The Future of Cushioning, 2016, 13 pages.
https://www.toyobo-global.com/seihin/breathair/breathair_youto.htm, Applications, Sep. 10, 2019, 5 pages.
https://www.toyobo-global.com/seihin/breathair_youto_htm, Toyobo Breathair, Cushion Materials, 1996-2013, 3 pages.
https://www.youtube.com/watch?v=eFiPBu_fBe4, The Making of a Newton Wovenaire Crib Mattress—YouTube, 3 Pages, Apr. 21, 2016.
www.newtonbaby.com pages design, Borninwater, designed to breathe, Jan. 28, 2021, 11 pages.

* cited by examiner

METHOD AND APPARATUS FOR PRODUCING A VEHICLE INTERIOR COMPONENT

CROSS REFERENCE TO RELATED APPLICATIONS

This application is the U.S. national phase of PCT Application No. PCT/US2023/025923 filed on Jun. 22, 2023, which claims the benefit of Danish (DK) patent application no. PA202370255 filed May 26, 2023, U.S. provisional application Ser. No. 63/355,809 filed Jun. 27, 2022, U.S. provisional application Ser. No. 63/356,549 filed Jun. 29, 2022, and U.S. provisional application Ser. No. 63/503,292 filed May 19, 2023, the disclosures of which are hereby incorporated in their entirety by reference herein.

TECHNICAL FIELD

Various embodiments of the present disclosure relate to a method and apparatus for producing a vehicle interior component, seat cushions, and assemblies, systems, and methods for manufacturing or forming seat cushions.

DETAILED DESCRIPTION

Figure 1:
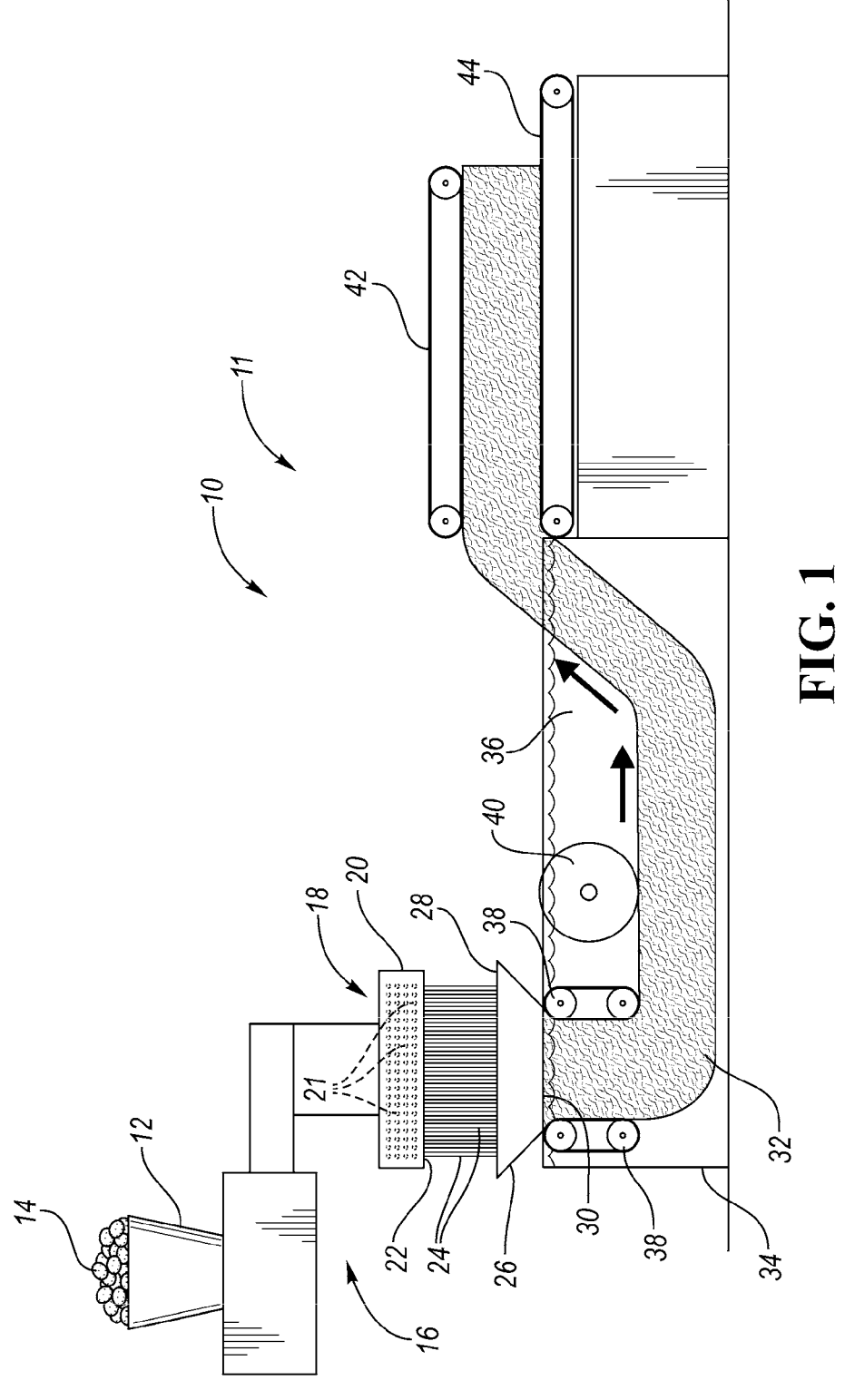
FIG. 1 shows a schematic illustration of a system and method in accordance with embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The terminology controller may be provided as one or more controllers or control modules for the various components and systems. The controller and control system may include any number of controllers, and may be integrated into a single controller, or have various modules. Some or all of the controllers may be connected by a controller area network (CAN) or other system. It is recognized that any controller, circuit, or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Referring to FIG. 1, a schematic illustration of a system 10 usable with a method 11 in accordance with embodiments described herein is shown. A hopper 12 holds solid granules of a polymeric material 14 that is to be extruded. In some embodiments, the material 14 is linear low-density polyethylene (LLDPE), although methods described herein may use different types of polymers as desirable and effective to produce the finished product. The material 14 is fed from the hopper 12 to an extruder 16. The extruder 16 melts and transports the material 14 to a die-plate arrangement 18, which includes a die plate 20. The extruder 16 may be, for example, a conventional extruder that includes a barrel that receives a rotatable screw. Rotation of the screw forces the material 14 to move through the barrel and helps heat the material because of the friction generated as the screw rotates. Heating elements may be disposed on the barrel and heat the polymeric material 14 inside the barrel.

The material 14 exits the extruder 16 at location 22 under pressure and in a molten state. Unless otherwise stated, the term "molten" as used herein means that the material is at least partially melted. It does not mean that the material is necessarily in a fully liquid state; rather, it means that the material is not completely solid and is still able to flow through elements of the system 10. For example, the molten material is still able to flow through the die plate 20, but it may be very viscous and starting to solidify. Once the solid granules of the polymeric material 14 are melted in the extruder 16, the material will begin to cool as it ceases to be agitated by the extruder screw and gets farther from any heaters. At different points in the process 11, the material may have a higher or lower viscosity, but if it is still partially melted and able to flow—even slowly—the term "molten" is applied herein.

The die plate 20 extrudes the material 14 into filaments 24. More specifically, the die plate 20 has multiple holes 21 disposed therethrough—only some of which are labeled in FIG. 1 for clarity—through which the molten material 14 passes. A single filament 24 is extruded from each die-plate hole. The filaments 24 fall downward from the die plate 20 under system pressure and the force of gravity to a funnel 26. The funnel 26 helps consolidate or group the filaments 24 into a more compact arrangement in which the filaments 24 bend or loop, and each filament 24 contacts and bonds to at least one other filament 24. In some embodiments, the funnel 26 has a funnel inlet 28 and a funnel outlet 30 that is smaller than the funnel inlet 28. More specifically, the funnel 26 is narrower at the funnel outlet 30 than at the funnel inlet 28. Individual separated filaments 24 enter the funnel inlet 28, the filaments 24 then bend or loop and move into contact with each other as they accumulate and slide down the funnel 26 toward the funnel outlet 30, and the consolidated filament structure 32 exits the funnel outlet 30 and enters a water tank 34. When the filaments 24 reach the funnel 26, those filaments near the outer part of the funnel 26—approximately 2-3 rows—slide down an angled surface of the funnel 26, which creates a skin on the consolidated filament structure 32.

The water tank 34 holds water 36 and receives the consolidated filament structure 32 from the funnel 26. The water 36 performs at least two functions. First, it helps to temporarily support the consolidated filament structure 32 to prevent it from collapsing or condensing into a less open or less porous arrangement. As such, the water 36 provides some resistance that causes the additional bending and looping of the filaments 24 to further build the consolidated filament structure 32. Second, the water 36 cools the polymeric filaments 24 from the outside to solidify them. The temperature of the water 36 may be much less than the temperature of the filaments 24 as they leave the die plate 20, for example, it may be at the temperature of the ambient environment surrounding the tank 34. Although the fluid used in this embodiment is liquid water 36, in other embodiments, other types of fluids may be used.

The water tank 34 includes various rollers and conveyors that help move the consolidated filament structure 32 through and out of the water 36. A tractor conveyor 38 is submerged in the water 36 and engages opposing lateral sides of the consolidated filament structure 32 to move it away from the funnel 26 at approximately the same speed as the consolidated filament structure 32 exits the funnel 26. The gap between the opposing portions of the tractor conveyor 38 is slightly narrower than the width of the consolidated filament structure 32 to allow the tractor conveyor 38 to better grip the consolidated filament structure 32. As previously noted, FIG. 1 is a schematic representation and has been simplified for illustration purposes. For example, a conveyor, such as the tractor conveyor 38, may be located toward the front and back of the system 10 as it is oriented in FIG. 1, rather on the left and right sides as shown.

Another roller 40 helps keep the consolidated filament structure 32 submerged and helps guide it through the water 36 toward a conveyor belt 42 and a shaker table 44 that are positioned outside of the water tank 34. The shaker table 44 shakes the consolidated filament structure 32 while it is on the conveyor belt 42 to remove at least some of the water 36. Pressurized air may also be blown toward the consolidated filament structure 32, which may also be squeezed to remove more of the water 36. Finally, the consolidated filament structure 32 may be cut to a desired size and shape.

Figure 2:
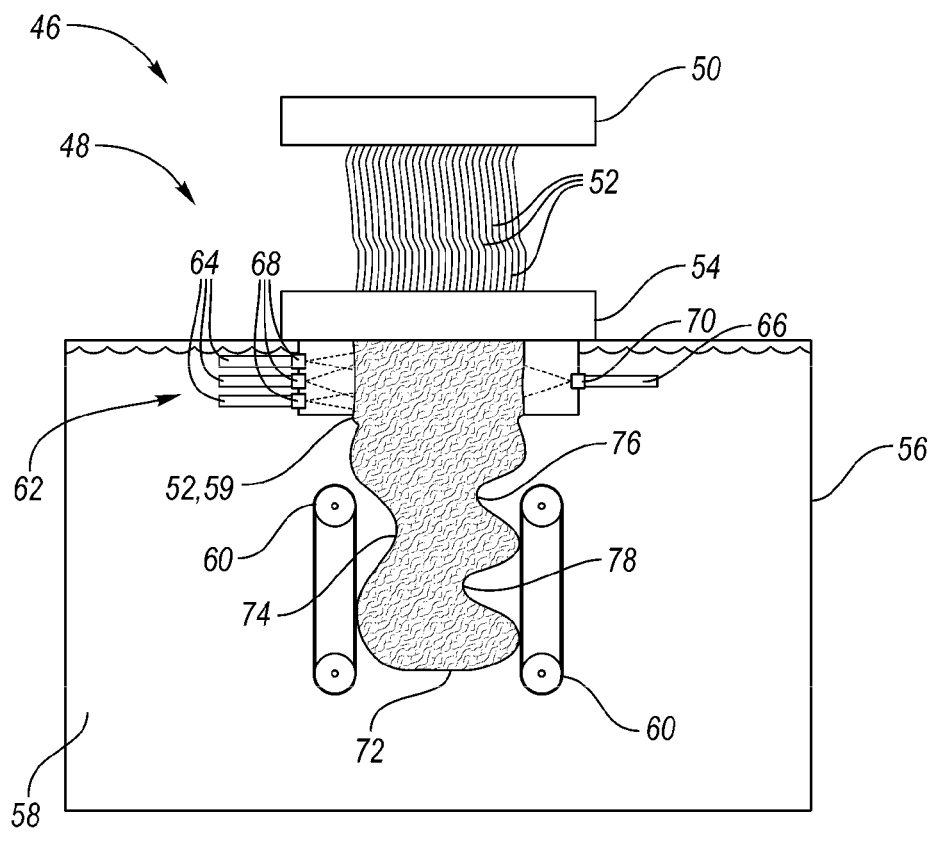
FIG. 2 shows a schematic illustration of a system and method in accordance with embodiments described herein.

FIG. 2 shows a portion of a system 46 similar to the system 10 shown in FIG. 1. This portion of the system 46 can be used to perform a method 48 in accordance with embodiments described herein. The system 46 includes a die plate 50 having a plurality of holes disposed therethrough, which may be positioned at the end of an extruder, such as the extruder 16 shown in FIG. 1. Similar to the method 11 described in conjunction with FIG. 1, a plurality of molten polymeric filaments 52—only some of which are labeled in FIG. 2 for clarity—are formed as a molten polymer moves through the holes in the die plate 50. The molten polymeric filaments 52 move downward from the die plate 50 into a funnel 54, which helps to consolidate them and guide them into a fluid bath 56, which, as described above, may be used for cooling the molten polymer. In this embodiment, the bath 56 is a tank filled with water 58, but in other embodiments, a fluid bath, such as the fluid bath 56, may be filled with fluids other than water, depending on the particular application.

As the molten polymeric filaments 52 enter the fluid 58, they begin to cool and form a consolidated filament structure 59. At this stage, the filaments 52 are just beginning to form a more solid structure, but are still in a compliant state. More specifically, the filaments 52 forming the beginning of the consolidated filament structure 59 can be moved and arranged into different shapes that will remain when the filaments 52 are completely solidified. A tractor conveyor 60 engages the consolidated filament structure 59 to move it away from the funnel 54. Similar to the system 10 shown in FIG. 1, the system 46 may include additional rollers, conveyors, etc. to guide the filament structure 59 through the remainder of the system 46. As shown in FIG. 2, the system 46 also includes a conduit arrangement 62 having several conduits 64. The conduits 64 may be configured, for example, as tubes for applying a fluid stream to the molten polymeric filaments 52 as they begin to cool in the fluid bath 56. On the opposite side of the consolidated filament structure 59 is another conduit or tube 66, which is also configured to apply a fluid stream to the filaments 52 as they begin to cool in the water bath 56.

In accordance with a method described herein, the tubes 64, 66 may be used to apply a fluid stream to the molten polymeric filaments 52 such that the filaments 52 are imparted with the desired shape so that a consolidated filament structure having the desired shape is formed. In the embodiment shown in FIG. 2, there are three of the tubes 64 on one side of the filaments 52 and one of the tubes 66 on the other side of the filaments 52. In other embodiments, different conduit arrangements having different numbers of tubes may be used. For example, a conduit arrangement as used with embodiments described herein may have a "stacked" arrangement as the tubes 64 are shown in FIG. 2, they could be placed in a row horizontally, or they could be positioned in an array pattern to achieve a desired shape. As described above, the tubes 64, 66 are configured to apply a fluid stream to the filaments 52.

In the embodiment shown in FIG. 2, the fluid used for the fluid stream is the water 58 taken from the water tank. A pump or other device may be used to force the fluid through the tubes 64, 66 and toward the filaments 52. In other embodiments, other fluids may be used, including liquids other than the one filling the tank 56, or the fluid could be mostly or completely gaseous so that air or some other gas is streamed toward the filaments 52. Also as shown in FIG. 2, the tubes 64 and the tube 66 are positioned to apply fluid streams in two different directions—i.e., the tubes 64 apply fluid streams directly opposite the fluid stream applied by the tube 66. In other embodiments, a tube or tubes may apply a fluid stream in a single direction, or in different directions that are not opposite each other.

Each of the tubes 64 includes a nozzle 68 positioned at its end closest to the filaments 52. Similarly, the tube 66 has a nozzle 70 positioned at its end closest to the filaments 52. These nozzles 68, 70 may be convergent—i.e., having an exit opening that is smaller than the inside diameter of the tubes 64, 66. Alternatively, the nozzles 68, 70 may be divergent—i.e., they may act as a diffuser having an exit opening that is larger than the inside diameter of the tube 64, 66. In some embodiments, a different combination of convergent and divergent nozzles may be used to achieve a desired shape of the consolidated filament structure 59. In the embodiment shown in FIG. 2, the nozzles 68, 70 are positioned approximately 10-15 millimeters (mm) from a surface of the filaments 52, although in other embodiments they may be positioned closer to or farther away from the filaments depending on the desired effect. Although the tubes 64, 66 are shown on opposite sides of the filaments 52, in other embodiments, a tube or tubes may be placed at different positions around the outside of the filaments 52, again based on a desired final shape for the consolidated filament structure 59.

As the molten polymeric filaments 52 begin to cool and form the consolidated filament structure 59, they will become increasingly solid—this is shown at a lower portion 72 of the consolidated filament structure 59, which is positioned near the end of the tractor conveyor 60. As shown in FIG. 2, the fluid flowing through the nozzles 68 contacts the polymeric filaments 52 and forms an indentation or channel 74 in the consolidated filament structure 59. Similarly, the fluid flowing through the nozzle 70 on the side opposite the conduit arrangement 62 forms indentations or channels 76 to 78 in the other side of the consolidated filament structure 59. Depending on the size, shape, and array of tubes and associated nozzles, various shapes can be imparted to a consolidated filament structure, such as the consolidated filament structure 59.

Figure 3:
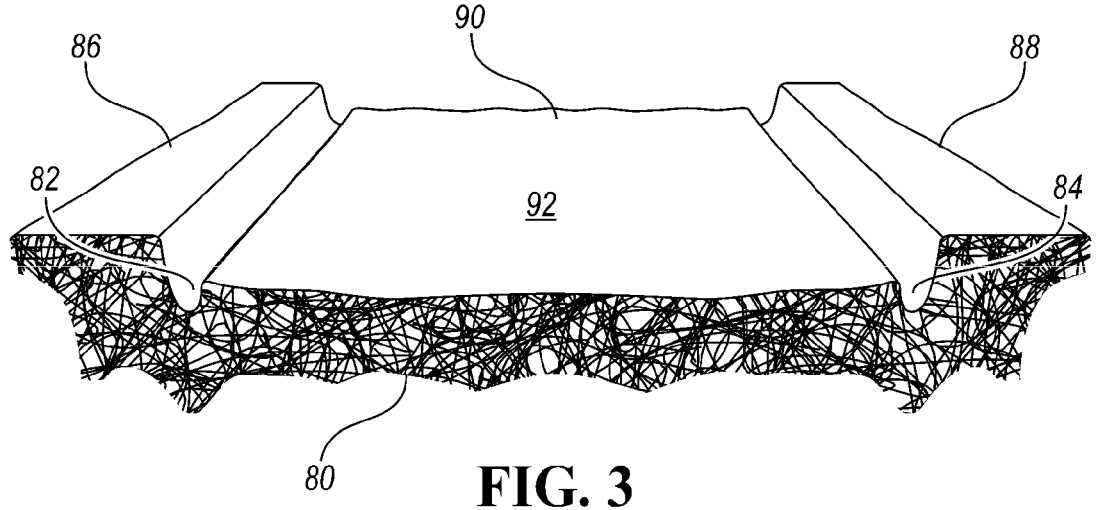
FIG. 3 shows a consolidated filament structure used as a cushion blank for a vehicle seat with side bolsters formed in accordance with embodiments described herein.

This flexibility may be particularly convenient when the consolidated filament structure is intended for use as a vehicle interior component. For example, the consolidated filament structure 59 may be used as a cushion blank for part of a vehicle seat. To reduce time and cost—particularly in postprocessing operations—the consolidated filament structure 59 may be formed with systems and methods described herein to create a net- or near-net-shaped structure. For example, the channels formed by the fluid streams may be positioned on either side of a seat cushion to help form bolsters or other desirable features. FIG. 3 shows a consolidated filament structure forming a cushion blank 80, created using embodiments such as described above.

Specifically, embodiments described herein were used to form two channels 82, 84 on either side of the cushion blank 80, by applying a fluid stream to the molten polymeric filaments in a fluid tank such as illustrated in FIG. 2. Two bolsters 86, 88 are positioned on opposite sides of the cushion blank 80, adjacent to respective channels 82, 84. The bolsters 86, 88 can be formed by applying fluid streams on the opposite side of the cushion blank 80 from the channels 82, 84, to push the bolster portions 86, 88 upward as shown in FIG. 3. Alternatively, a central portion 90 of the cushion blank 80 may be subject to an array of fluid streams to push it downward so the bolster portions 86, 88 rise above a surface 92 of the central portion 90. Some combination of these two techniques may also be used. In this way, the use of fluid streams, such as described in conjunction with FIG. 2, are used to create a consolidated filament structure having a desired shape.

Figure 4:
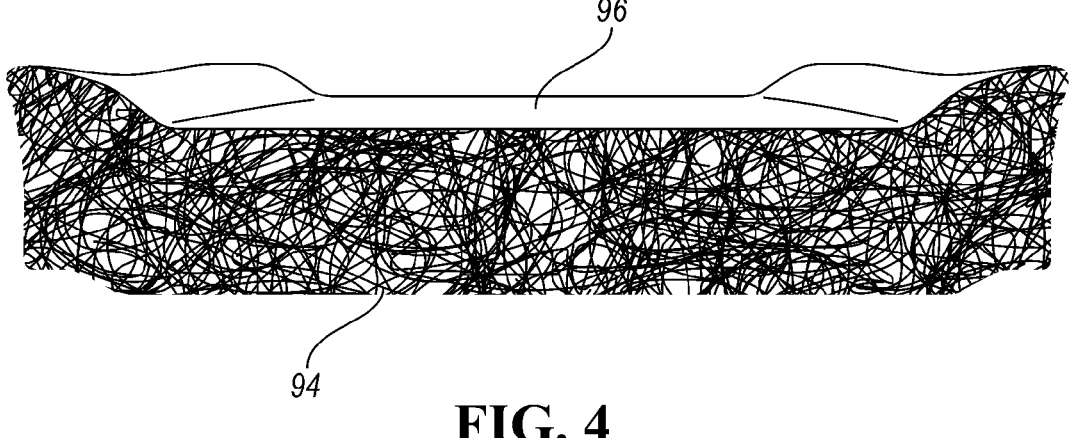
FIG. 4 shows a consolidated filament structure used as a cushion blank for a vehicle seat with a concave central portion formed in accordance with embodiments described herein.
Figure 5:
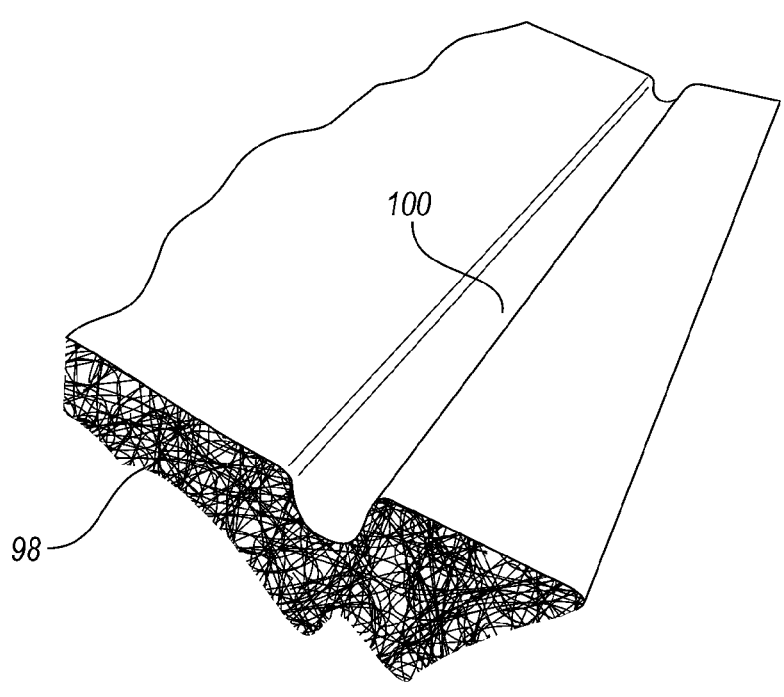
FIG. 5 shows a consolidated filament structure used as a cushion blank for a vehicle seat with a channel formed in accordance with embodiments described herein.

Embodiments of systems and methods described herein may also be used to form different types of shapes useful for different applications. For example, FIG. 4 shows a consolidated filament structure 94, that is also intended for use as a cushion blank for a vehicle interior component, such as a vehicle seat. The filament structure 94 includes a somewhat concave central portion 96 formed by an array of fluid streams contacting that side of the molten polymeric fila-
ments as they move through the fluid bath. In this embodi-
ment, the side portions of the cushion blank 94 are not so
pronounced as to be bolsters, but the central portion 96 is
somewhat lower than the sides, which forms a desirable
shape for a seated occupant. In FIG. 5, another consolidated
filament structure 98 is shown. The filament structure 98 is
also configured for use as a cushion blank, and in this
embodiment, a channel 100 is formed in a surface of the
cushion blank 98. The channel 100 may form a convenient
location for a sewing seam on a trim cover, which are
typically pulled into channels or other indentations in the
cushion material to provide a more aesthetically pleasing
finished product.

Figures 6, 7, 8:
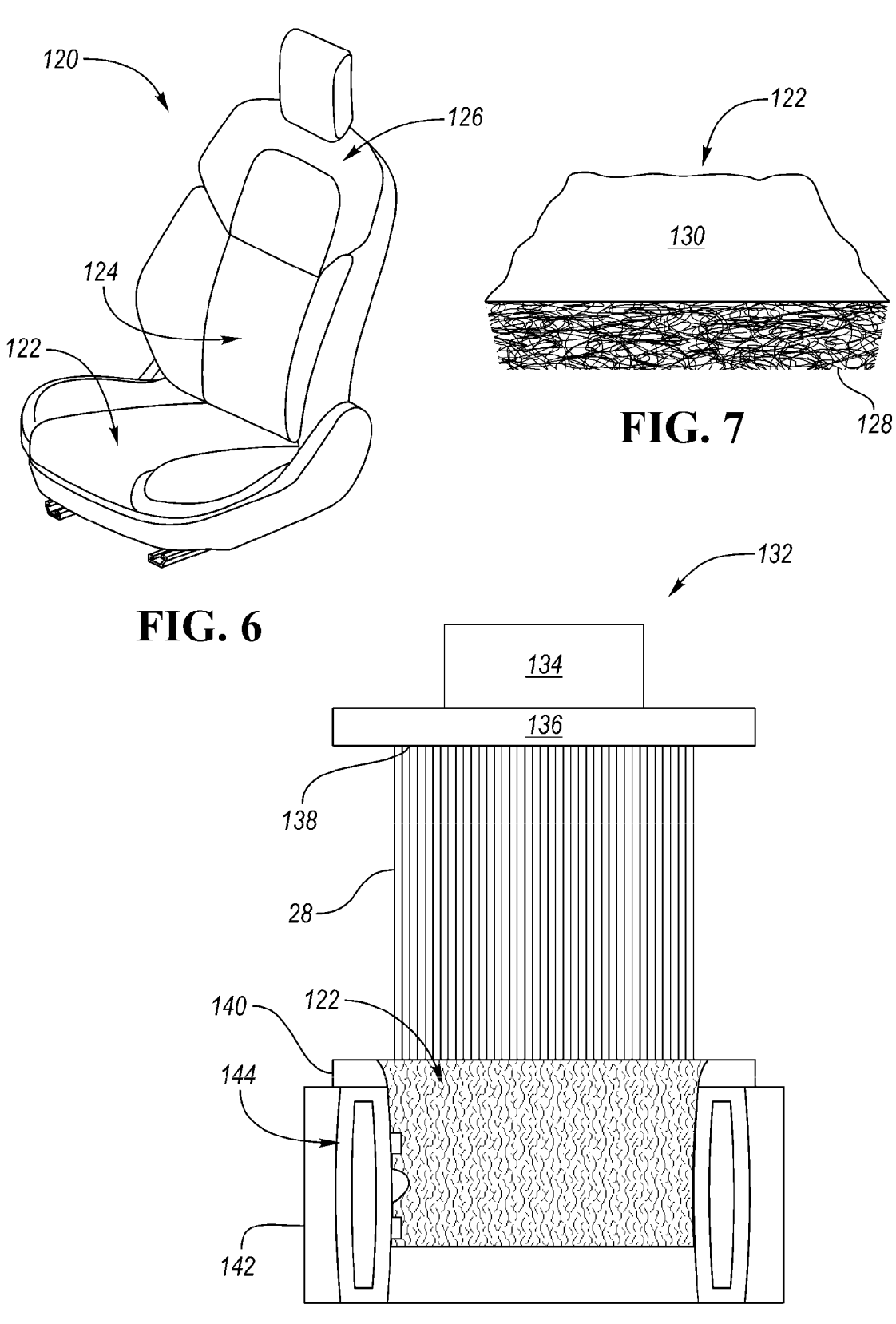
FIG. 6 is a front perspective view of a seat assembly according to some embodiments.
FIG. 7 is a front partial perspective view of a cushion of the seat assembly of FIG. 6, according to some embodiments.
FIG. 8 is a front elevation schematic view of a system to manufacture the seat cushion of FIG. 7.

FIG. 6 illustrates a seat assembly 120 as a vehicle seat
assembly 120 according to some embodiments. Although
the vehicle seat assembly 120 is illustrated and described,
any seat assembly 120 may be employed. The seat assembly
120 may be utilized in a land vehicle, aircraft, watercraft, or
the like. The seat assembly 120 may also be utilized as an
office chair, comfort chair, or the like.

The depicted seat assembly 120 includes a seat bottom
cushion 122 to support a pelvis and thighs of a seated
occupant. The seat assembly 120 also includes a seat back
cushion 124 to support a back and shoulders of the seated
occupant. A trim cover 126 is provided over the seat
cushions 122, 124 to conceal the cushions 122, 124 and
provide a uniform and smooth contact surface for the
occupant.

Referring now to FIG. 7, one of the seat cushions 122 is
partially illustrated disassembled from the seat assembly
120. The seat cushion 122 is formed from a plurality of
strands 128 of an extruded, expanded thermoplastic resin.
The seat cushion 122 is also formed with a base layer 130
bonded to, and/or formed unitarily with, the plurality of
strands 128.

Referring now to FIG. 8, the seat cushions 122, 124 are
manufactured from a system 132 and a process of extruded
thermoplastic resin mesh. In the depicted embodiment, an
extruder 134 provides a pressurized molten thermoplastic
resin to an extrusion die 136. The extrusion die 136 is
arranged with a plurality of outlet ports or nozzles 138 to
dispense the plurality of strands 128 of the molten thermo-
plastic resin. The strands 128 are dispensed through a funnel
plate 140 and into a fluid chamber 142. The funnel plate 140
guides the strands 128 into the fluid chamber 142. The fluid
chamber 142 retains a fluid, such as water, to resist and cool
the strands 128. The fluid chamber 142 resists a flow of the
strands 128, thereby causing the strands 128 to buckle, loop,
and intersect with adjacent strands 128 within a profile
defined by the funnel plate 140. The strands 128 may also
expand and float within the fluid chamber 142. The strands
128 are cooled in the fluid chamber 142 by the fluid to form
a unitary non-woven thermoplastic cushion 122. According
to this process the non-woven thermoplastic cushion 122 is
resisted, cooled, and solidified by the fluid.

The system 132 includes a conveyor assembly 144 in the
fluid chamber 142. The conveyor assembly 144 conveys the
plurality of strands 128 through the fluid chamber 142. The
conveyor assembly also provides an outer boundary to the
strands 128 to shape the strands 128 with a contour as the
cushion 122. Regular conveyors would otherwise produce a
cushion with a rectangular cross-section. However, the seat
cushion 122 is contoured for occupant support and comfort.
The conveyor assembly 144 is a shaping conveyor for
forming a contour into the cushion 122.

Figures 9, 10, 11:
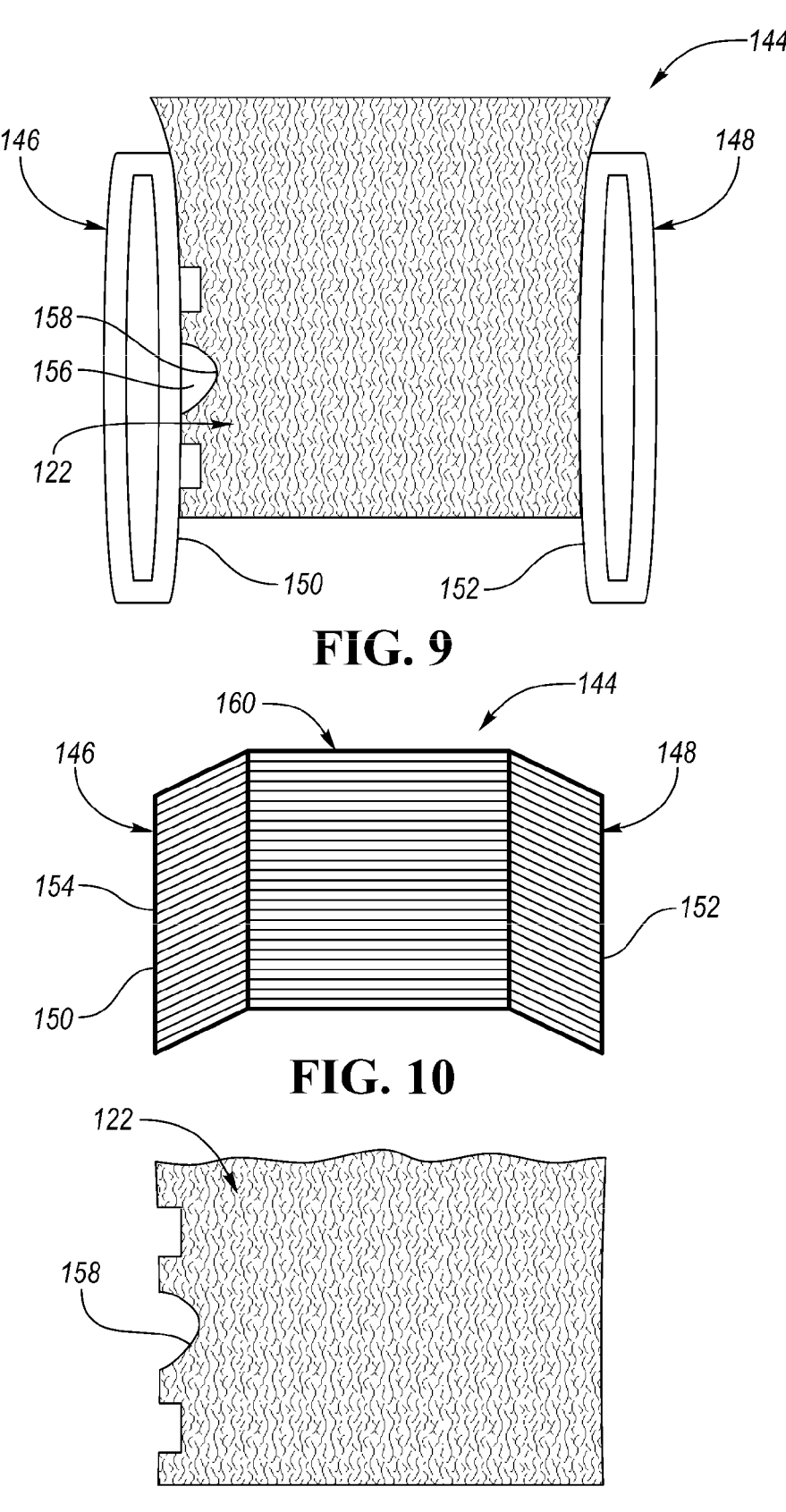
FIG. 9 is a front elevation schematic view of a conveyor assembly of the system of FIG. 8, according to some embodiments.
FIG. 10 is a front perspective schematic view of a conveyor assembly of the system of FIG. 8, according to some embodiments.
FIG. 11 is a front elevation view of a cushion manufactured with the conveyor assembly of FIG. 9.

The conveyor assembly 144 is illustrated in FIG. 9. The
conveyor assembly 144 includes a pair of conveyors 146,
148. The conveyors 146, 148 are employed to form shapes
or features on the mesh cushion 122. The conveyors 146 148
press a shape into the mesh cushion 122 within the fluid
chamber 142 before the mesh cushion 122 has cured and set
into its final shape. The preliminary shaping is formed into
the mesh cushion 122 at an initial region as the strands 128
enter the fluid. For example, the conveyors 146, 148 may
engage the strands 128 within the first inch of the fluid,
based on one example of the funnel plate 140 and the die
plate 136. The conveyors 146, 148 maintain contact with the
cushion 122 until the mesh 122 cures, such as about six
inches into the fluid.

Each of the conveyors 146, 148 include a track 150, 152
for travelling about the conveyors 146, 148 for conveying
the mesh 122 between the tracks 150, 152. In the embodi-
ment of FIG. 9, the track 150 travels clockwise; and the track
152 travels counterclockwise. As illustrated in FIG. 10, each
of the tracks 150, 152 includes a plurality of links 154
pivotally interconnected as a chain link track 150, 152.
According to one example, each track 150, 152 includes 96
links 154 with flat or contact surfaces. Alternatively, the
tracks 150, 152 may be formed from a belt or the like.

Referring again to FIG. 9, a plurality of shaping tools 156
are attached to the track 150 to form shapes, features, and/or
contours 158 in the mesh cushion 122. The shaping tools 156
are modular and are attached to the track 150. For automa-
tion flexibility, the shaping tools 156 are interchangeable so
that the shaping tools 156 can be interchanged so that
various cushion 122 designs are manufactured between the
tracks 150, 152. Alternatively, the tracks 150, 152 may be
configured to form multiple cushion 122 designs to manu-
facture various seat cushions 122 on one system 132.

FIG. 9 illustrates that the conveyors 146, 148 are oriented
parallel, spaced apart, and facing each other. FIG. 10 illus-
trates that a third conveyor 160 may also be employed to
bound a third side of the cushion 122 during the forming and
cooling process. The third conveyor 160 is oriented adjacent
to the conveyors 146, 148 and is perpendicular to the
conveyors 146, 148. A fourth conveyor (not shown) may
also be utilized and oriented spaced apart, and parallel to the
third conveyor 160 to bound and form all sides of the
cushion 122. Of course, any number of conveyors 146, 148,
160 may be utilized.

As illustrated in FIG. 11, the mesh cushion 122 is illus-
trated as a final cured shape 122 with a plurality of recessed
features 158 formed therein from the shaping tools 156. The
recessed features 158 may create shape, contour, test mark-
ers, location markers, contact surface features, trenches or
features for attachment of the cushion 122 to a seat frame,
seat trim, actuators, heat transfer devices, or the like. By
forming the recessed features 158 concurrently with the
forming of the mesh cushion 122, secondary forming opera-
tions can be minimized or omitted. Instead of forming the
cushion 122 with a rectangular cross section as depicted in
FIG. 7, the cushion 122 in FIG. 11 is formed with a contour
that requires less secondary forming or cutting operations.
The shaping tools 156 may be provided on any of the
conveyors 146, 148, 160.

Figure 12:
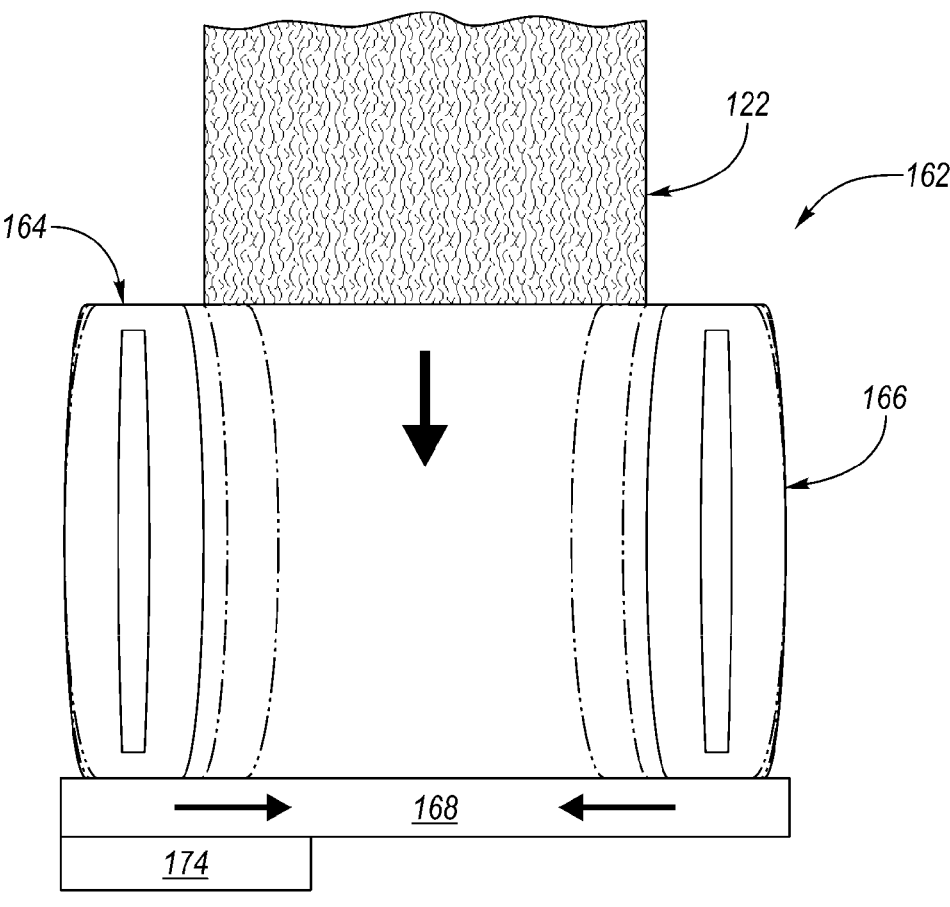
FIG. 12 is a front elevation schematic view of a conveyor assembly of the system of FIG. 8, according to some embodiments.

FIG. 12 illustrates a conveyor assembly 162 according to
another embodiment. The conveyor assembly 162 includes
a pair of spaced apart and parallel conveyors 164, 166.
Similar to the prior embodiment, the conveyor assembly 162
is oriented with the fluid chamber 142 to receive, shape, and
convey the molten thermoplastic strands 128. A linear actua-
tor 168 cooperates with the conveyors 164, 166 to vary the spacing between the conveyors 164, 166 for shaping of the mesh 122. The conveyors 164, 166 are actuated as the mesh 122 is shaped, cooled, and translated through the conveyors 164, 166.

Figure 13:
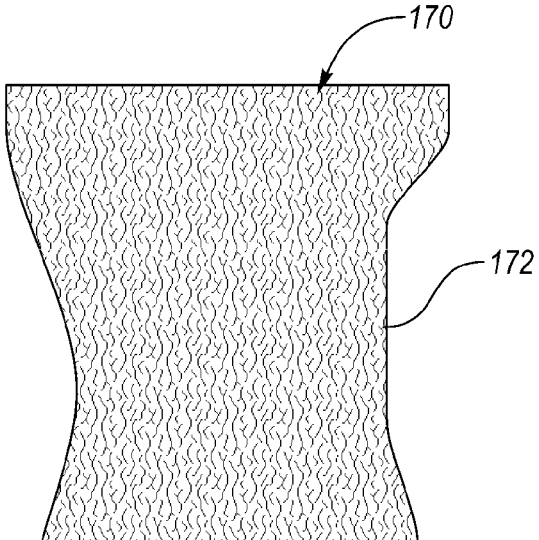
FIG. 13 is a front elevation view of a cushion manufactured with the conveyor assembly of FIG. 12.

FIG. 13 illustrates a cushion 170 formed by the conveyor assembly 162 of FIG. 12. The cushion 170 includes contours 172 that were formed during the shaping and conveying of the mesh 122 by the conveyor assembly 162. Referring again to FIG. 12, the linear actuator 168 is in communication with a controller 174 for controlling the linear actuator 168 to actuate one or more of the conveyors 164, 166. Various mesh cushions 170 with various contours 172 are manufactured by the conveyor assembly 162 without changing tooling of the conveyor assembly 162. The various cushions 170 are manufactured by operating various programs with the controller 174.

The fluid chamber 142 in FIG. 8 is utilized as a heat transfer chamber 142. The fluid chamber 142 is employed to cool the mesh 122 to solidify and bond the strands 128. The fluid chamber 142 may also be utilized to heat the mesh 122. For example, an entrance region of the fluid may be heated, while a subsequent region of the fluid may be cooled to assist in the shaping and forming of the cushion 122. For example, the fluid may be heated to 130 degrees Fahrenheit at the ingress region of the fluid chamber 142. The heating and cooling settings may be varied for various seat cushion 122 designs.

Figure 14:
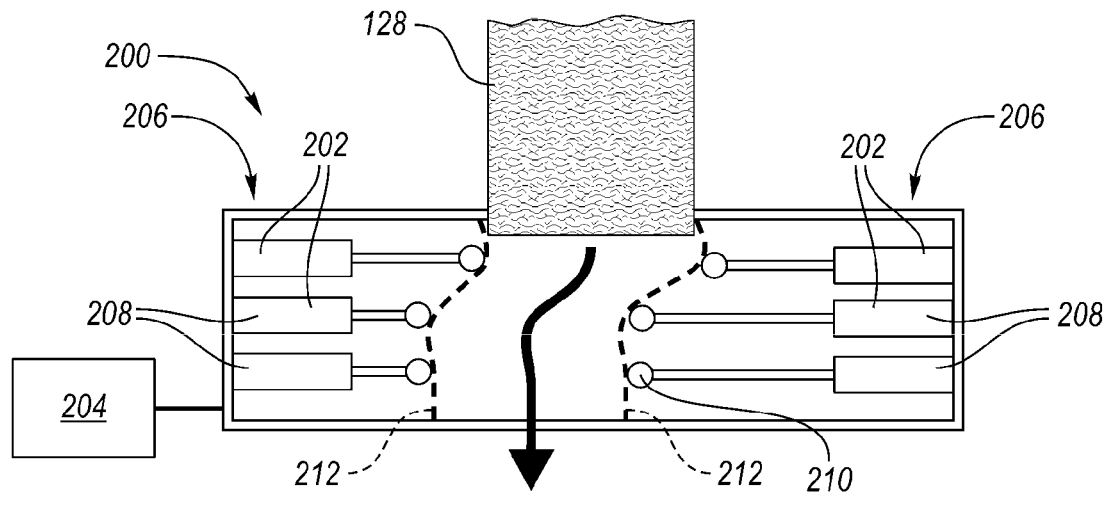
FIG. 14 is a side elevation schematic view of an actuator assembly for use with the system of FIG. 8, according to some embodiments.
Figure 15:
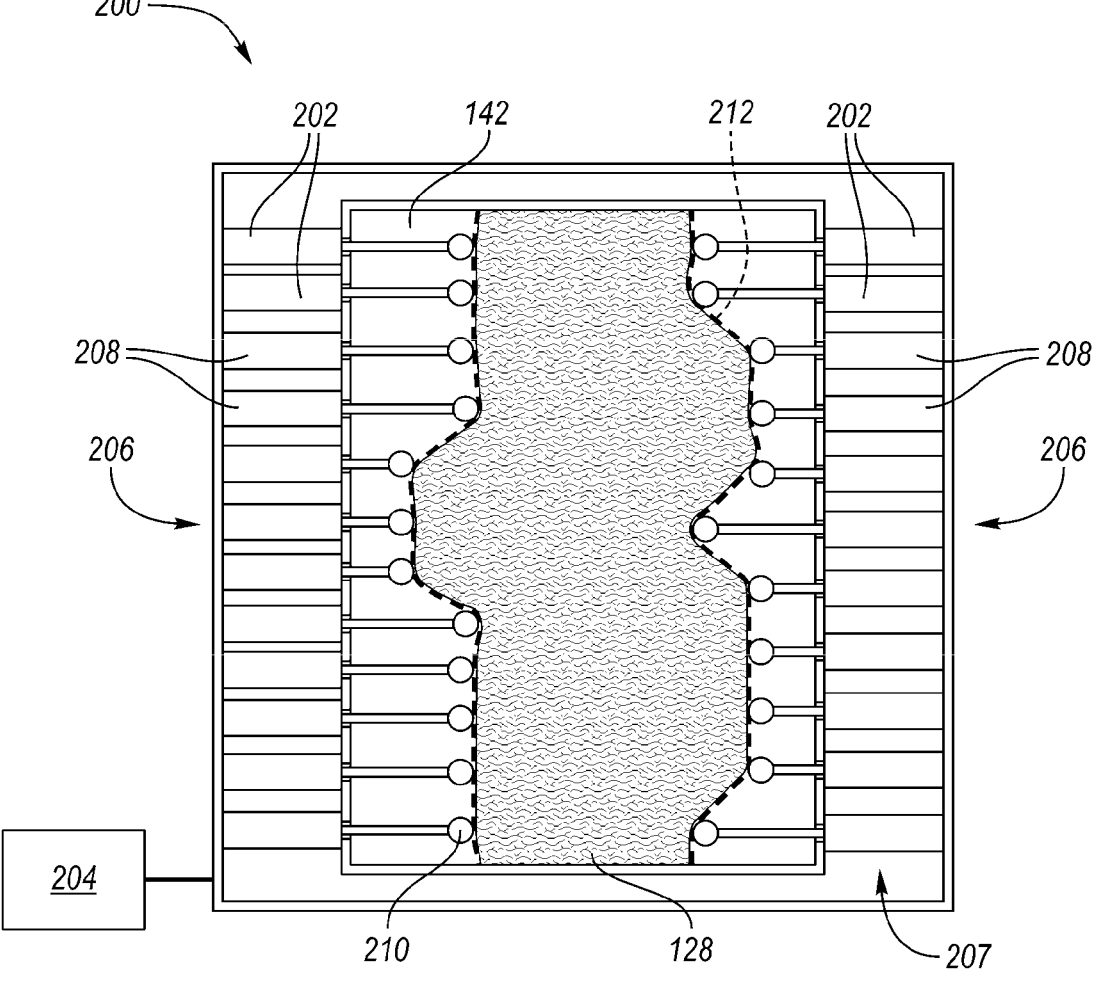
FIG. 15 is a top perspective schematic view of the actuator assembly of FIG. 14.

FIGS. 14-15 illustrate side and top views, respectively, of an actuator assembly 200 according to some embodiments. According to one non-limiting example, the actuator assembly 200 may be used with the system 132 in place of the conveyor assembly 144 in FIG. 8, or in addition to conveyors that assist in moving the strands 128 through the fluid chamber 142. The actuator assembly 200 may be positioned at least partially within or submerged in the fluid chamber 142. The actuator assembly 200 is moved and controlled to provide an outer boundary to the strands 128 to shape the strands 128 with a contour, for example, as the cushion 122, and provide a non-rectangular cross-section for the cushion 122. However, the seat cushion 122 is contoured for occupant support and comfort. The actuator assembly shapes and forms a contour into the cushion 122 by exerting a force on the strands 128 to locally displace or compress the strands and form a feature 158.

The actuator assembly 200 includes one or more actuators 202, such as electro-mechanical actuators, pneumatic actuators, hydraulic actuators, or the like. In one non-limiting example, the actuators 202 are provided as linear actuators.

A controller 204 is provided for use in controlling the positions of each of the actuators 202. The controller may be similar to that described above with respect to controller 174.

The actuators 202 may be arranged in one or more arrays 206. In the example shown, there are two arrays 206 of actuators 202, with the arrays on opposite sides of the strands 128 from one another in the assembly 200 to apply force or pressure to one or both sides of the strands 128.

In other examples, only a single array may be provided, or more than two arrays may be provided. In one example, only a single array 206 is provided on one side of the strands 128, with a non-moving backing support provided opposite to the array 206 for forming the strands 128.

In another example, there may be arrays 206 provided on all four sides of assembly 200 to shape all four sides of the strands 128 as they move through the assembly.

Each actuator array 206 may include a row 207 containing a plurality of actuators. Each array 206 may additionally include one or more layers of rows of actuators.

In the example shown, there are three layers 208 in each array 206 as can be seen in FIG. 14, although arrays 206 with fewer than three layers or more than three layers are also contemplated. FIG. 15 illustrates one layer 208 in each of the arrays 206, or the top layer, as it is a top view of the assembly 200. As shown, the layers 208 of rows may be positioned to be stacked in a direction of travel for the product.

Although the arrays 206 of actuators illustrate the actuators 202 arranged in a linear row 207 within each layer, and with movement in a common direction, it is also contemplated that the actuators 202 may be arranged along a curved or otherwise shaped row or path, and may additionally or alternatively move in different directions relative to one another. For example, an actuator 202 in one array 206 may be oriented to move at an angle, such as an acute angle, relative to another actuator 202 in the same array 206, which may allow for further profiles or shapes of the strands 128 and resulting cushion 122.

The assembly 200 provides for a computer controlled forming assembly, or forming ring, for the strands 128 using the actuators 202 in the arrays 206. By providing multiple layers 208, the overall contour surface may be increased to contact and shape the strands. The actuators 202 of the assembly 200 may be at least partially submerged within the fluid chamber 142, to produce the desired forms and profiles for the cushion 122. The assembly 200 may provide for continuously forming or shaping strands 128 using the arrays 206 of actuators 202. By controlling the positions of the actuators 202 in each array 206 as the strands 128 move through the assembly 200 via the controller 204, the profile or shape of the resulting cushion 122 may be dynamically controlled.

Each of the actuators is provided with a head 210 at a distal end of the moving actuator arm or member. The head 210 may be provided in various shapes and sizes, and may have a curved, planar, or otherwise shaped surface that interacts with the stranded members 128. In one example, the head 210 is coated or formed from a rubber material such as a natural or synthetic rubber, e.g. to provide added compression to the stranded material 128.

In one example, the heads 210 of the actuators 202 directly contact and interface with the strands 128 within the assembly 200. In another example, one or more flexible and/or elastic layers 212 may be provided between the heads 210 of the actuators and the strands 128 within the assembly, such that the heads 210 of the actuators 202 contact the layer 212, which in turn, contacts the strands 128.

The controller 204 may control the actuators 202 independently or individually, and may further actuate one or more actuators 202 (e.g. as a group) to provide various contours, shapes, and profiles for the cushion 122 by shaping the outer surface of the bundle of strands 128 within the assembly 200. In one example, opposing actuators 202 are actuated to compress the stranded material 128. The various heads 210 of the actuators 202 cooperate to compress the outer perimeter surface of the stranded material 128 to create an integrated contour shape. For example, the controller 204 may control the actuators 202 based on the desired cushion 122 shape, and the actuator 202 control may be based on the cushion 122 being segmented or sliced to correspond to the layers 208 in the arrays 206.

The controller 204 may further control the actuation distance of each of the actuators 202, or the stroke, to control the resulting profile and shape of the cushion 122. Furthermore, the controller 204 may control the actuation time, or time that the actuator 202 is at a deployed position or in contact with the stranded material 128 to control the resulting profile and shape of the cushion 122. In one example, the stroke may be controlled by controlling the air pressure to that actuator.

The controller may receive a signal indicative of the speed of the strands 128 through the assembly 200, or the feed rate of the strands, in order to control the actuators 202 to provide the desired profile and shape of the cushion. The controller 204 may further provide a signal to the extruder 134 to control the flow rate, or run rate, of the strands 128 therefrom.

After the strands 128 exit the assembly, e.g. through the bottom of the assembly 200 as shown in FIG. 14, the strands 128 may be cut in order to form an individual cushion 122.

The actuators 202 are employed to form shapes or features on the mesh cushion 122 by pressing a shape into the mesh cushion 122 within the fluid chamber 142 before the mesh cushion 122 has cured and set into its final shape.

The actuators 202 may be controlled and selectively actuated to form a mesh cushion 122 with contours, recesses, or features 158 as described above, or other shapes. By forming the contours and recessed features 158 concurrently with the forming of the mesh cushion 122, secondary forming operations can be minimized or omitted. Instead of forming the cushion 122 with a rectangular cross section as depicted in FIG. 7, the cushion 122 in FIG. 11 is formed with a contour that requires fewer secondary forming or cutting operations.

Figures 16, 17, 18:
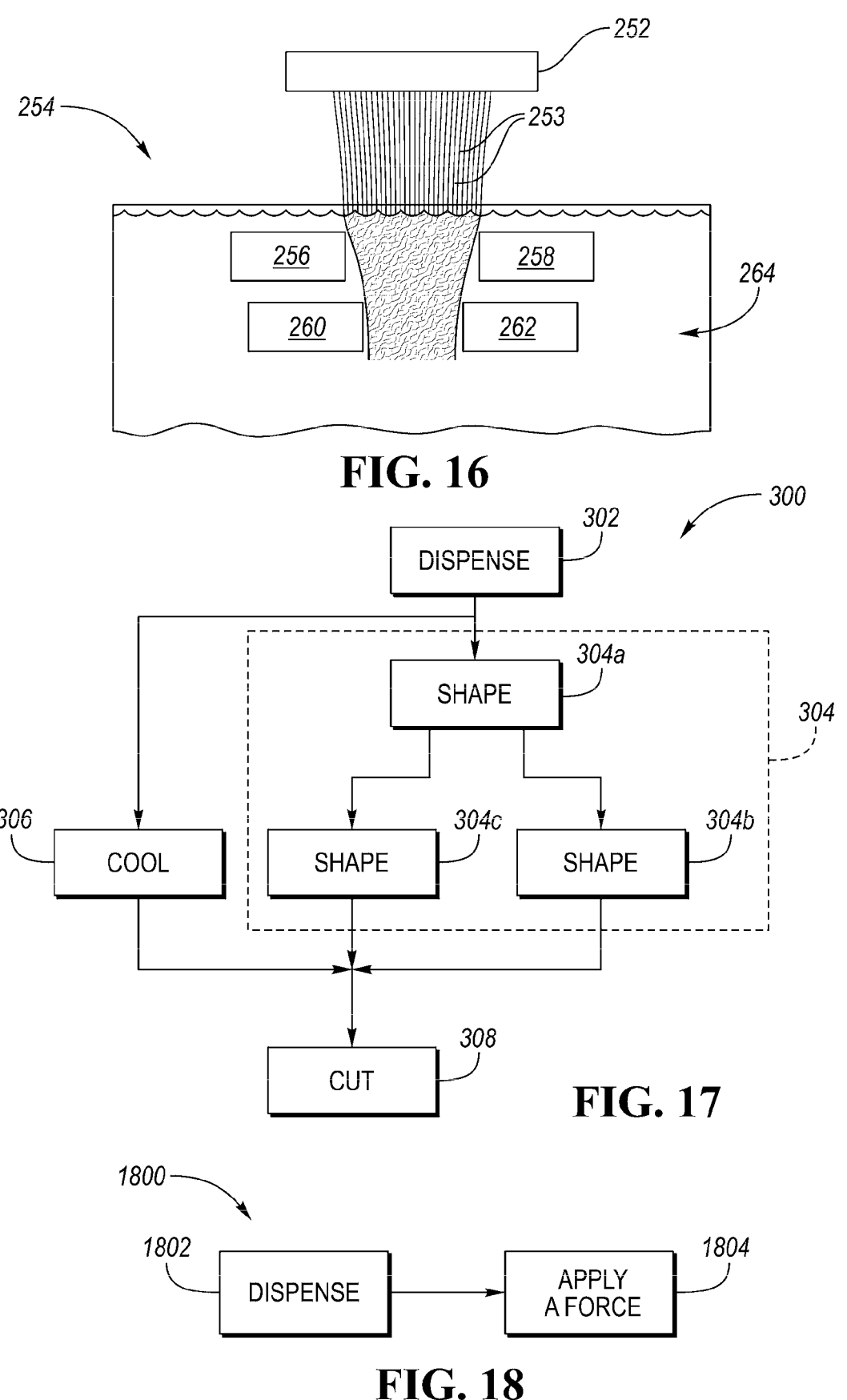
FIG. 16 shows a schematic view of a system with an assembly and one or more sub-assemblies according to some embodiments.
FIG. 17 shows a method for forming and shaping a product with an assembly and one or more sub-assemblies according to some embodiments.
FIG. 18 shows a method for forming and shaping a product according to some embodiments.

FIG. 16 is a schematic view illustrating a system 250 for use in shaping a product 253, for example, a product formed from a plurality of strands of thermoplastic resin, e.g. as a consolidated filament structure. A dispenser 252 is provided to dispense a plurality of strands of molten thermoplastic resin. The dispenser 252 may be provided with an extruder and a die as described above according to one example. The strands or product may be shaped by an assembly 254. The assembly 254 may be provided with one or more sub-assemblies. In one example, the assembly 254 is provided with a single sub-assembly as described above. In another example, the assembly 254 is provided with two, three, four, or more sub-assemblies as described above, and in any combination of sub-assemblies. Each sub-assembly may be provided as: (i) a first sub-assembly 256 with a conveyor to convey a product, and a plurality of shaping tools attached to the conveyor to shape the product as the product is conveyed along the conveyor, (ii) a second sub-assembly 258 with a pair of spaced apart conveyors to convey the product therebetween, and an actuator in cooperation with the pair of conveyors to vary the spacing between the pair of conveyors to shape the product as the product conveyed, (iii) a third sub-assembly 260 with an actuator array comprising one or more actuators, each actuator deployable to contact the product, and a controller configured to control a position of each actuator to contact and shape the product as the product is moved past the actuator array, or (iv) a fourth sub-assembly 262 comprising one or more nozzles positioned to direct fluid towards the product to shape the product as the product is moved past the one or more nozzles. The sub-assemblies may be arranged in sequential order in relation to the product, and/or may be positioned to simultaneously act on the product. FIG. 16 illustrates a representative and non-limiting schematic arrangement of sub-assemblies 256, 258, 260, 262, and other arrangements of sub-assemblies are also contemplated as described herein.

As shown, and according to one non-limiting example, one or more of the sub-assemblies may be at least partially submerged in a fluid bath 264 to act on and shape the product. Other elements, such as a funnel, and additional rollers or tractor conveyors may be further provided for use with the system 250, similar to that described above, and are not shown in the schematic view of FIG. 16 for simplicity.

FIG. 17 illustrates a method 300 for forming a product, such as a contoured consolidated filament structure. In various examples, various steps in the method 300 may be omitted, added, rearranged into another order, or performed sequentially or simultaneously. At step 302, a plurality of strands of a molten polymeric material are dispensed, e.g. from a die. At step 304, a force is applied onto the plurality of strands via one or more shaping assemblies thereby shaping the plurality of strands as a contoured consolidated filament structure. The shaping assemblies may be provided by one or more nozzles, one or more shaping conveyors, and/or one or more actuator assemblies. The shaping assemblies 304 are shown as having a first shaping assembly 304a first shaping the product, followed by two shaping assemblies 304b, 304c simultaneously acting on and shaping the product. In other examples, the shaping assemblies 304 may be arranged to act on and shape the product in other orders, including sequentially, in parallel, or in any combination thereof. The shaping assembl(ies) 304 shape the product by directing one or more fluid jets from the one or more nozzles thereby applying the force on the plurality of strands, conveying the plurality of strands along the one or more shaping conveyors thereby applying the force on the plurality of strands, or actuating one or more actuators to contact the plurality of strands thereby applying the force on the plurality of strands. The product is cooled within a fluid bath at step 306. Note that steps 304 and 306 may occur simultaneously as shown such that the product is shaped within the fluid bath while it is being cooled, with the assembl(ies) 304 at least partially submerged within the fluid bath. Or the cooling at step 306 may occur simultaneously with only some of the shaping steps 304, or subsequent thereto. At step 308, the contoured filament structure is cut to form a member. The member may then be subsequently used, for example, as a cushion, and installed onto a seat assembly frame.

Seat assemblies, seats, or chairs may be used herein to refer generally to an assembly which incorporates the teachings of one or more embodiments disclosed herein, which may include any combination of embodiments, or features of embodiments disclosed herein. Similarly, the terms: seat assembly, seat, or chair may refer to the same or similar assemblies. Seat bottoms, backs, bases, head restraints, headrests, or bolsters may be used herein to refer generally to any component, region or portion of a vehicle interior component, a seat assembly, vehicle seat, or chair. Filaments or strands may be used herein to refer to the generally linear polymeric units (although they may be looped, fused or bonded together to form a mesh-like structure) after being dispensed through one or more orifices of the die plate or extrusion die, which are likewise used to refer to equivalent components. Similarly, the terms: product, a contoured unitary mesh product, consolidated filament structure, filament structure, mesh, extruded material, cushion blank, thermoplastic cushion, mesh cushion, seat cushion, or cushion may refer to the same or similar components. The term funnel and funnel plate may be used to refer to the same or similar components as well. In yet another example, tank, water tank, fluid bath, and fluid chamber may refer to the same or similar components. In a further example, the term tractor conveyor and conveyor assembly may refer to the same or similar components. The use of different terms to refer to the same or similar components may be used to avoid confusion when describing different preferred embodiments. The terms may be interchangeable as various components of features from various embodiments may be combined in manners not expressly described herein. This does not detract from the fact that certain terms may provide inherent detail not included by other interchangeable term(s) unless expressly stated otherwise (e.g., water tank and fluid chamber refer to similar interchangeable components although in at least one preferred embodiment, the tank is filled with water or arranged to be filled with water as opposed to any liquid when water tank is used).

A method 1800 is described and illustrated with respect to FIG. 18. Method 1800 includes dispensing 1802 a plurality of strands (e.g. 24, 52, 128, and/or 253) of a molten polymeric material (e.g., linear low-density polyethylene (LLDPE)). In some embodiments, filaments or strands may be used herein to refer to the generally linear polymeric units (although they may be looped, fused or bonded together to form a mesh-like structure).

Method 1800 includes applying 1804 a force on the plurality of strands (e.g. 24, 52, 128, and/or 253) via one or more shaping assemblies (e.g. 254, 256, 258, 260, 262) to shape the product (e.g. 32, 59, 94, 98, and/or 253) as the product is conveyed. The one or more shaping assemblies may be provided, e.g., by nozzles (e.g. 68 and/or 70), a pair of spaced apart conveyors (e.g., 144, 146, 148, 160, 162, 164, and/or 166), and/or an actuator (e.g. 200, 202). In some embodiments, the nozzles (e.g. 68 and/or 70) may be nozzles with fluid streams in a single direction, or in at least two different directions that are opposite or not opposite to one another; the nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid and/or gas. In some embodiments, the conveyors (e.g., 144, 146, 148, 160, 162, 164, and/or 166) may be provided with an actuator (e.g. 168 to vary the spacing between the conveyors; the conveyors may be parallel; one or more conveyors may be provided with a track (e.g. 150, 152) on the conveyor, and the tracks may be links or a belt; shaping tools (e.g. 156) may be connected to the tracks and may be interchangeable; the shaping tools may form shapes, contour, and recesses (e.g. 158) in the product; and/or there may be four conveyors to surround product. In some embodiments, the actuator (e.g. 202) may be a linear actuator, electro-mechanical actuator, pneumatic actuator, and/or hydraulic actuators, and further may include an array (e.g. 206) of actuators, e.g. a first, second, third, and fourth array to surround the product, with each array at least partially submerged within the fluid bath; an optional elastic layer (e.g. 212) may be positioned between the actuator heads (e.g. 210) and the product; a controller (e.g. 204) may be provided to control the distance that actuator extends to shape the product, the time that the actuator is deployed to contact product, and/or control the actuator based on a feed rate of the product; each actuator (e.g. 202) may be provided with a head (e.g. 210) at a distal end to shape the product; the head may be coated or formed from a rubber material; the head (e.g. 210) may have different shapes including curved or planar; and/or the actuator array (e.g. 206) may have a row (e.g. 207) of actuators that is straight or curved or angled, and contain any number of actuators; and each array may also have multiple layers (e.g. 208) of rows, e.g. rows stacked on one another in the direction of travel such that the product passes multiple layers of actuators. In some embodiments, the one or more shaping assemblies thereby shape the plurality of strands as a contoured consolidated filament structure (e.g., 80, 94, 98, 122, 124, and/or 170; consolidated filament structure, filament structure, mesh, extruded material, cushion blank, thermoplastic cushion, mesh cushion, seat cushion, and/or cushion). In some embodiments, a cooling chamber, fluid bath, fluid chamber, and/or heat transfer chamber (e.g. 34, 56, 142, and/or 264) may be provided; with fluid in fluid bath resisting the flow, and/or forming the consolidated filament structure, filament structure, mesh, extruded material, cushion blank, thermoplastic cushion, mesh cushion, seat cushion, or cushion. In some embodiments, the consolidated filament structure (e.g. 32, 59, 94, 98, and/or 253) may be shaped while the fluid in fluid bath resists the flow, with cooling by the fluid in the fluid bath, and/or while applying the force while the strands are in the fluid bath.

In some embodiments, and for method 1800, the shaping assembly (e.g. 254, 304) includes at least one of: one or more nozzles (e.g. 68 and/or 70), one or more shaping conveyors (e.g., (e.g., 144, 146, 148, 160, 162, 164, and/or 166), and/or one or more actuator assemblies (e.g. 200). In some embodiments, the nozzles (e.g. 68 and/or 70) may provide fluid streams in a single direction, or in at least two different directions that are opposite or not opposite to one another; the nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid/gas). In some embodiments, the one or more shaping conveyors (e.g., 144, 146, 148, 160, 162, 164, and/or 166) may be provided by a pair of spaced apart conveyors; an actuator (e.g. 168) may be provided to vary the spacing between the pair of conveyors to shape the product as the product conveyed; the conveyors (e.g., 144, 146, 148, 160, 162, 164, and/or 166) may be parallel, and the actuator (e.g. 168) may be a linear actuator; the one or more conveyors may be provided with a track on the conveyor; the tracks may be links or a belt; the shaping tools (e.g. 156) are connected to the tracks and are interchangeable; the shaping tools may form shapes, contour, and recesses (e.g. 158) in the product; the conveyors (e.g., 144, 146, 148, 160, 162, 164, and/or 166) may be parallel; there may be four conveyors to surround product; and/or there may be a cooling chamber, fluid bath, fluid chamber, or heat transfer chamber (e.g. 34, 56, 142, and/or 264), wherein the fluid in fluid bath resists the flow, forms the consolidated filament structure, filament structure, mesh, extruded material, cushion blank, thermoplastic cushion, mesh cushion, seat cushion, and/or cushion. In some embodiments, the one or more actuators (e.g. 202) may include an array (e.g. 206) of actuators; may include up to a first, second, third, and fourth array to surround the product; each array may be at least partially submerged within the fluid bath (e.g. 34, 56, 142, and/or 264); optional elastic layer (e.g. 212) positioned between the actuator heads (e.g. 210) and the product; the actuators (e.g. 202) may be linear actuators, electro-mechanical actuators, pneumatic actuators, hydraulic actuators; a controller (e.g. 204) may be provided to control a distance that actuator extends to shape the product, a time that the actuator is deployed to contact product, and/or control an actuator based on a feed rate of the product; each actuator (e.g. 202) may have a head (e.g. 210) at a distal end to shape the product; the head may be coated or formed from a rubber material; the head may have different shapes including curved or planar; the actuator array (e.g. 206) may have a row (e.g. 207) of actuators that is straight or curved or angled, and contain any number of actuators; and/or each array may also have multiple layers (e.g. 208) of rows, e.g. rows stacked on one another in the direction of travel such that the product passes multiple layers of actuators).

In some embodiments, method 1800 further comprises at least one of: directing one or more fluid jets from the one or more nozzles (e.g. 68 and/or 70) thereby applying the force on the plurality of strands (e.g. 24, 52, 128, and/or 253), conveying the plurality of strands (e.g. 24, 52, 128, and/or 253) along the one or more shaping conveyors (e.g., 144, 146, 148, 160, 162, 164, and/or 166) thereby applying the force on the plurality of strands (e.g. 24, 52, 128, and/or 253), and/or actuating one or more actuators (202) to contact the plurality of strands thereby applying the force on the plurality of strands (e.g. 24, 52, 128, and/or 253). In some embodiments, the nozzles (e.g. 68 and/or 70) may provide fluid streams in a single direction, or in at least two different directions that are opposite or not opposite to one another; the nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid/gas. In some embodiments, the conveyors (e.g., 144, 146, 148, 160, 162, 164, and/or 166) may be provided by a pair of spaced apart conveyors and an actuator (e.g. 168) may be provided to vary the spacing between the pair of conveyors to shape the product as the product conveyed; the conveyors may be parallel; the actuator (e.g. 168) may be a linear actuator; one or more conveyors may be provided with a track (e.g. 150 and/or 152) on the conveyor; the tracks may be links or a belt; shaping tools (e.g. 156) may be connected to the tracks and may be interchangeable; the shaping tools may form shapes, contour, and recesses (e.g. 158) in the product; the conveyors may be parallel; there may be four conveyors to surround product; and/or it may include a cooling chamber, fluid bath, fluid chamber, or heat transfer chamber (e.g. 34, 56, 142, and/or 264) where the fluid in fluid bath may resist the flow, and/or form the consolidated filament structure, filament structure, mesh, extruded material, cushion blank, thermoplastic cushion, mesh cushion, seat cushion, and/or cushion. In some embodiments, the actuators (e.g. 202) may include an array (e.g. 206) of actuators, with up to a first, second, third, and fourth array to surround product; each array may be at least partially submerged within the fluid bath (e.g. 34, 56, 142, and/or 264); an optional elastic layer (e.g. 212) may be positioned between the actuator heads (e.g. 210) and the product; the actuators may be linear actuators, electro-mechanical actuators, pneumatic actuators, hydraulic actuators; a controller (e.g. 204) may be provided to control a distance that actuator extends to shape the product, a time that the actuator is deployed to contact product, and/or control an actuator based on a feed rate of the product; each actuator (e.g. 202) may have a head (e.g. 210) at a distal end to shape the product; the head may be coated or formed from a rubber material; the head may have different shapes including curved or planar; the actuator array (e.g. 206) may have a row (e.g. 207) of actuators that is straight or curved or angled, and contain any number of actuators; and/or each array may also have multiple layers (e.g. 208) of rows, e.g. rows stacked on one another in the direction of travel such that the product passes multiple layers of actuators).

In some embodiments, method 1800 includes moving the plurality of strands (e.g. 24, 52, 128, and/or 253) through a fluid bath (e.g. 34, 56, 142, and/or 264) (e.g., via tractor conveyors and/or rollers, e.g. 38 and/or 40), applying the force on the plurality of strands via the one or more shaping assemblies (e.g. 254, 304) while the plurality of strands is at least partially submerged the fluid bath (e.g., such that shaping occurs within fluid bath).

In some embodiments, method 1800 includes cooling the plurality of strands (52 and/or 59) within the fluid bath (e.g., 34, 56, 142, and/or 264; a cooling chamber, fluid chamber, and/or heat transfer chamber).

In some embodiments, method 1800 includes cutting the contoured consolidated filament structure (e.g. 32, 59, 94, 98, and/or 253). In some embodiments, filaments or strands (e.g. 24, 52, 128, and/or 253) may be used herein to refer to the generally linear polymeric units (although they may be looped, fused or bonded together to form a mesh-like structure); and/or the consolidated filament structure, filament structure, mesh, extruded material, cushion blank, thermoplastic cushion, mesh cushion, seat cushion, or cushion may form at least one of a vehicle interior component (e.g., a seat assembly, seat, or chair may refer to the same or similar assemblies; seat bottoms, backs, bases, head restraints, headrests, or bolsters may be used herein to refer generally to any component, region or portion of a vehicle interior component, a seat assembly, vehicle seat, or chair; and/or a unitary non-woven cushion (e.g., 80, 94, 98, 122, 124, and/or 170) (e.g., a cushion blank, thermoplastic cushion, mesh cushion, seat cushion, or cushion).

In some embodiments, method 1800 includes heating (e.g., heating in an extruder (e.g. 16, and/or 134), rotating screw extruder, and/or optional heating elements) a polymeric material (e.g., linear low-density polyethylene (LL-DPE)) to a molten state, such that it becomes the molten polymer. In some embodiments, method 1800 may include introducing the molten polymer into a die plate (e.g., 18, 20, and/or 136) having a plurality of holes disposed therethrough such that the molten polymer moves through the holes and forms the plurality of strands (e.g. 24, 52, 128, and/or 253) as molten polymeric filaments (e.g., from the extruder to the die or die plate). In some embodiments, filaments or strands (e.g. 24, 52, 128, and/or 253) may be used herein to refer to the generally linear polymeric units (although they may be looped, fused or bonded together to form a mesh-like structure) after being dispensed through one or more orifices of the die plate or extrusion die. In some embodiments, method 1800 includes introducing the molten polymeric filaments into a bath (e.g. 34, 56, 142, and/or 264) (e.g., fluid chamber, cooling chamber, and/or heat transfer chamber) to cool the molten polymeric filaments. In some embodiments, method 1800 includes applying a fluid stream (e.g., via nozzles 68 and/or 70) to the molten polymeric filaments via the one or more shaping assemblies (e.g., 254, 304) to apply the force after the molten polymeric filaments are introduced into the bath such that the molten polymeric filaments are imparted with a desired shape and the consolidated filament structure having the desired shape is formed (e.g., using nozzles (e.g. 68 and/or 70) with fluid streams in a single direction, or in at least two different directions that are opposite or not opposite to one another; nozzles may be divergent with an exit opening that is larger than the inlet and/or convergent with an exit opening that is smaller than the inlet; and/or a pump may be used to provide fluid to the nozzles from either the fluid bath or as another fluid/gas).

In some embodiments, the method 1800 includes a bath (e.g. 34, 56, 142, and/or 264) contains a liquid, and the fluid stream (e.g., via nozzles 68 and/or 70) comprises the liquid. In some embodiments, the nozzles use fluid within the fluid bath.

In some embodiments, applying the fluid stream to the molten polymeric filaments comprises moving the fluid stream through a nozzle (e.g., 68 and/or 70) before it contacts the molten polymeric filaments (e.g., a pump is used to pump fluid from the bath or another liquid/gas, including air).

In some embodiments, and for use with the method 1800, the nozzle (e.g., 68 and/or 70) is positioned 10-15 mm from a surface of the molten polymeric filaments.

In some embodiments, method 1800 includes applying a plurality of the fluid streams (e.g., via nozzles 66 and/or 70) to the molten polymeric filaments after the molten polymeric filaments are introduced into the bath (e.g. 34, 56, 142, and/or 264). In some embodiments, nozzles 66 and/or 70 may provide with fluid streams in a single direction, or in at least two different directions that are opposite or not opposite to one another; nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid/gas.

In some embodiments, and with the method 1800, the fluid streams (e.g., via nozzles 66 and/or 70) are applied to the molten polymeric filaments (e.g. 24, 52, 128, and/or 253) in a single direction.

In some embodiments, and with the method 1800, the fluid streams (e.g., 66 and/or 70) are applied to the molten polymeric filaments (e.g. 24, 52, 128, and/or 253) in at least two different directions (e.g., directions that are opposite or not opposite to one another).

In some embodiments, method 1800 includes heating a polymeric material (e.g., a linear low-density polyethylene (LLDPE)) to a molten state to create the molten polymeric material (e.g., heating in an extruder 16 and/or 134, rotating screw extruder, and/or using optional heating elements). In some embodiments, method 1800 includes extruding the molten polymeric material to form a plurality of molten polymeric filaments as the plurality of strands (e.g. 24, 52, 128, and/or 253). In some embodiments, filaments or strands (e.g. 24, 52, 128, and/or 253) may be used herein to refer to the generally linear polymeric units (although they may be looped, fused or bonded together to form a mesh-like structure) after being dispensed through one or more orifices of the die plate or extrusion die, e.g. 18, 20, 50, and/or 136. In some embodiments, method 1800 includes cooling the molten polymeric material in a fluid bath (e.g., 34, 56, 142, and/or 264; a fluid chamber, cooling chamber, and/or heat transfer chamber) to create a consolidated filament structure (e.g. 32, 59, 94, 98, and/or 253). In some embodiments, method 1800 includes applying a fluid stream (e.g., via nozzles 68 and/or 70) to apply the force to the molten polymeric filaments in the fluid bath via the one or more shaping assemblies such that the consolidated filament structure has a desired shape as the contoured consolidated filament structure (e.g., using nozzles with fluid streams in a single direction, or in at least two different directions that are opposite or not opposite to one another; nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid/gas).

In some embodiments, the consolidated filament structure (e.g. 32, 59, 94, 98, and/or 253) is a cushion blank (e.g., 80, 94, 98, 122, 124, and/or 170) for a vehicle seat, and the desired shape includes two bolsters (e.g., 86 and/or 88) positioned on opposite sides of the cushion blank.

In some embodiments, method 1800 includes applying a plurality of the fluid streams (e.g., via nozzles 68 and/or 70) to the molten polymeric filaments (e.g. 24, 52, 128, and/or 253) in the fluid bath (e.g. 34, 56, 142, and/or 264) in at least one direction (e.g., at least two different directions that are opposite or not opposite to one another).

In some embodiments, at least one of the fluid streams is applied through a nozzle (e.g., 68 and/or 70) (e.g., a convergent or divergent nozzle).

In some embodiments, the nozzle (e.g., 68 and/or 70) is a divergent nozzle (e.g., where divergent is an exit opening that is larger than the inlet).

In some embodiments, and for method 1800, each of the fluid streams is applied to the molten polymeric filaments (e.g. 24, 52, 128, and/or 253) through a respective nozzle (e.g., 68 and/or 70) (e.g., a convergent or divergent nozzle).

In some embodiments, at least one of the nozzles (e.g. 68 and/or 70) is a convergent nozzle (e.g., where convergent is an exit opening that is smaller than the inlet).

In some embodiments, the fluid bath (e.g. 34, 56, 142, and/or 264) contains a liquid, and the fluid stream comprises the liquid. In some embodiments, the nozzles use fluid within the fluid bath (e.g. 34, 56, 142, and/or 264).

In some embodiments, method 1800 includes heating a polymeric material (e.g., a linear low-density polyethylene (LLDPE)) to create a molten polymeric material (e.g., by heating in an extruder 16 and/or 134, rotating screw extruder, and/or using optional heating elements). In some embodiments, method 1800 includes forming a plurality of molten polymeric filaments as the plurality of strands (e.g. 24, 52, 128, and/or 253) from the molten polymeric material. In some embodiments, filaments or strands may be used herein to refer to the generally linear polymeric units (although they may be looped, fused or bonded together to form a mesh-like structure) after being dispensed through one or more orifices of the die plate or extrusion die. In some embodiments, method 1800 includes cooling the molten polymeric material in a fluid bath (e.g., 34, 56, 142, and/or 264; a fluid chamber, and/or heat transfer chamber). In some embodiments, method 1800 includes directing a fluid stream (e.g., via nozzles 68 and/or 70) at the molten polymeric material in the fluid bath to apply the force via the one or more shaping assemblies such that the molten polymer obtains a desired shape (e.g., using nozzles 68 and/or 70 with fluid streams in a single direction, or in at least two different directions that are opposite or not opposite to one another; nozzles may be divergent with an exit opening that is larger than the inlet and/or convergent with an exit opening that is smaller than the inlet; and/or a pump may be used to provide fluid to the nozzles from either the fluid bath or as another fluid/gas).

In some embodiments, method 1800 includes cooling the molten polymer in the fluid bath (e.g., 34, 56, 142, and/or 264) to form a consolidated filament structure (e.g. 32, 59, 94, 98, and/or 253), and directing the fluid stream (e.g., via nozzles 68 and/or 70) at the molten polymer in the fluid bath imparts the desired shape to the consolidated filament structure as the contoured consolidated filament structure. In some embodiments, the technique shapes with fluid streams from nozzles while in the fluid bath.

In some embodiments, method 1800 includes directing a plurality of the fluid streams (e.g., from nozzles 68 and/or 70 with fluid streams in a single direction, or in at least two different directions that are opposite or not opposite to one another) at the molten polymeric material in the fluid bath (e.g., 34, 56, 142, and/or 264) in at least one direction.

In some embodiments, the consolidated filament structure is a cushion blank (e.g., 80, 94, 98, 122, 124, and/or 170) for a vehicle seat, and the desired shape includes two bolsters (e.g., 86 and/or 88) positioned on opposite sides of the cushion blank. In some embodiments, filaments or strands (e.g. 24, 52, 128, and/or 253) may be used herein to refer to the generally linear polymeric units (although they may be looped, fused or bonded together to form a mesh-like structure); consolidated filament structure (e.g. 32, 59, 94, 98, and/or 253), filament structure, mesh, extruded material, cushion blank, thermoplastic cushion, mesh cushion, seat cushion, or cushion.

In some embodiments, the molten polymeric material is a molten thermoplastic resin (e.g., linear low-density polyethylene (LLDPE)), and the contoured consolidated filament structure (e.g. 32, 59, 94, 98, and/or 253) is a contoured unitary mesh product. In some embodiments, filaments or strands (e.g. 24, 52, 128, and/or 253) may be used herein to refer to the generally linear polymeric units (although they may be looped, fused or bonded together to form a mesh-like structure); consolidated filament structure (e.g. 32, 59, 94, 98, and/or 253), filament structure, mesh, extruded material, cushion blank, thermoplastic cushion, mesh cushion, seat cushion, or cushion. In some embodiments, method 1800 includes conveying the plurality of strands (e.g. 24, 52, 128, and/or 253) along at least one shaping conveyor (e.g., 144, 146, 148, 160, 162, 164, and/or 166) of the one or more shaping assemblies while applying the force and shaping the plurality of strands as the contoured unitary mesh product. In some embodiments, the method 1800 includes a pair of spaced apart conveyors and an actuator (e.g. 168) to vary the spacing between the pair of conveyors to shape the product as the product conveyed; the conveyors may be parallel, the actuator may be a linear actuator; one or more conveyors may have a track (e.g. 150, 152) on the conveyor; the tracks may be links or a belt; shaping tools (e.g. 156) may be connected to the tracks and are interchangeable; the shaping tools may form shapes, contour, and recesses (e.g. 158) in the product; the conveyors may be parallel; there may be four conveyors to surround product; and/or a cooling chamber, fluid bath, fluid chamber, or heat transfer chamber (e.g. 34, 56, 142, and/or 264) may be provided where fluid in fluid bath may resist the flow, form the consolidated filament structure, filament structure, mesh, extruded material, cushion blank, thermoplastic cushion, mesh cushion, seat cushion, and/or cushion).

In some embodiments, method 1800 includes conveying the plurality of strands (e.g. 24, 52, 128, and/or 253) within a plurality of shaping conveyors (e.g., 144, 146, 148, 160, 162, 164, and/or 166) as the contoured unitary mesh product.

In some embodiments, method 1800 includes translating at least one of the plurality of shaping conveyors (e.g., 144, 146, 148, 160, 162, 164, and/or 166) to vary a spacing between the plurality of shaping conveyors while conveying and shaping the plurality of strands (e.g. 24, 52, 128, and/or 253) (e.g., a pair of spaced apart conveyors and an actuator (e.g. 168) may be used to vary the spacing between the pair of conveyors to shape the product as the product conveyed; the conveyors may be parallel, the actuator may be a linear actuator, and/or a cooling chamber, fluid bath, fluid chamber, or heat transfer chamber (e.g. 34, 56, 142, and/or 264) may be provided).

In some embodiments, method 1800 includes shaping the plurality of strands (e.g. 24, 52, 128, and/or 253) with at least one shaping tool (e.g., 156) attached to the at least one shaping conveyor (e.g., 144, 146, 148, 160, 162, 164, and/or 166) (e.g., one or more conveyors may be provided with a track (e.g. 150 and/or 152 on the conveyor; the tracks may be links or a belt; the shaping tools may be connected to the tracks and interchangeable; the shaping tools may form shapes, contour, and recesses (e.g. 158) in the product; the conveyors may be parallel; there may be four conveyors to surround product; and/or a cooling chamber, fluid bath, fluid chamber, or heat transfer chamber (e.g. 34, 56, 142, and/or 264) may be provided).

In some embodiments, method 1800 includes resisting a flow of the plurality of strands (e.g. 24, 52, 128, and/or 253), thereby buckling the plurality of strands, the buckled strands intersecting as a unitary non-woven body (e.g. 32, 59, 94, 98, and/or 253). In some embodiments, fluid in fluid bath (e.g. 34, 56, 142, and/or 264) resists the flow and forms the consolidated filament structure, filament structure, mesh, extruded material, cushion blank, thermoplastic cushion, mesh cushion, seat cushion, or cushion.

In some embodiments, method 1800 includes cooling the plurality of strands (e.g. 24, 52, 128, and/or 253) to bond as the contoured unitary mesh product (e.g. 32, 59, 94, 98, and/or 253). In some embodiments, the cooling may be in a fluid bath, fluid chamber, and/or heat transfer chamber (e.g. 34, 56, 142, and/or 264).

In some embodiments, method 1800 includes cooling the plurality of strands (e.g. 24, 52, 128, and/or 253) while shaping the plurality of strands (e.g., in a fluid bath, fluid chamber, and/or heat transfer chamber, (e.g. 34, 56, 142, and/or 264)).

In some embodiments, method 1800 includes cooling the plurality of strands (e.g. 24, 52, 128, and/or 253) in a cooling chamber (e.g., a fluid bath, fluid chamber, and/or heat transfer chamber, (e.g. 34, 56, 142, and/or 264)).

In some embodiments, the molten polymeric material is a molten thermoplastic resin (e.g., linear low-density polyethylene (LLDPE)), and the contoured consolidated filament structure (e.g. 32, 59, 94, 98, and/or 253) is a contoured unitary mesh product. In some embodiments, filaments or strands (e.g. 24, 52, 128, and/or 253) may be used herein to refer to the generally linear polymeric units (although they may be looped, fused or bonded together to form a mesh-like structure); consolidated filament structure, filament structure, mesh, extruded material, cushion blank, thermoplastic cushion, mesh cushion, seat cushion, or cushion). In some embodiments, method 1800 includes actuating one or more actuators (e.g., 202) of the one or more shaping assemblies to contact the plurality of strands thereby applying the force and shaping the plurality of strands as the contoured unitary mesh product. In some embodiments, the array (e.g. 206) of actuators optionally includes up to a first, second, third, and fourth array to surround product, with each array at least partially submerged within the fluid bath (e.g. 34, 56, 142, and/or 264); an optional elastic layer (e.g. 212) may positioned between the actuator heads (e.g. 210) and the product; the actuators may be linear actuators, electro-mechanical actuators, pneumatic actuators, hydraulic actuators; a controller may be provided to control a distance that the actuator extends to shape the product, a time that the actuator is deployed to contact product, and/or control an actuator based on a feed rate of the product; each actuator may have a head (e.g. 210) at a distal end to shape the product; the head may be coated or formed from a rubber material; the head may have different shapes including curved or planar;

the actuator array (e.g. 206) may have a row (e.g. 207) of actuators that is straight or curved or angled, and contain any number of actuators; and/or each array may also have multiple layers (e.g. 208) of rows, e.g. rows stacked on one another in the direction of travel such that the product passes multiple layers of actuators.

In some embodiments, method 1800 includes conveying the plurality of strands (e.g. 24, 52, 128, and/or 253) past the one or more actuators (e.g., 202) as the contoured unitary mesh product (e.g. 32, 59, 94, 98, and/or 253) (e.g. via tractor conveyors 38 and/or 60, and/or rollers 40).

In some embodiments, method 1800 includes actuating a first actuator of the one or more actuators (e.g., 202) and a second actuator of the one or more actuators (e.g., 202) opposite to the first actuator to vary a spacing therebetween while shaping the plurality of strands (e.g. 24, 52, 128, and/or 253).

In some embodiments, method 1800 includes resisting a flow of the plurality of strands, (e.g. 24, 52, 128, and/or 253) thereby buckling the plurality of strands, the buckled strands intersecting as a unitary non-woven body (e.g. 32, 59, 94, 98, and/or 253). In some embodiments, fluid in the fluid bath (e.g. 34, 56, 142, and/or 264) may resist the flow, and/or form the consolidated filament structure, filament structure, mesh, extruded material, cushion blank, thermoplastic cushion, mesh cushion, seat cushion, or cushion.

In some embodiments, method 1800 includes cooling the plurality of strands (e.g. 24, 52, 128, and/or 253) to bond as the contoured unitary mesh product (e.g. 32, 59, 94, 98, and/or 253) (e.g., cooling in fluid in fluid bath (e.g. 34, 56, 142, and/or 264)).

In some embodiments, method 1800 includes cooling the plurality of strands (e.g. 24, 52, 128, and/or 253) while shaping the plurality of strands (e.g., by applying the force while the strands are in the fluid bath (e.g. 34, 56, 142, and/or 264)).

In some embodiments, method 1800 includes cooling the plurality of strands (e.g. 24, 52, 128, and/or 253) in a fluid chamber (e.g., a fluid bath, cooling chamber, and/or a heat transfer chamber; 34, 56, 142, and/or 264).

In some embodiments, a vehicle interior component (e.g., a seat assembly, seat, or chair may refer to the same or similar assemblies. Seat bottoms, backs, bases, head restraints, headrests, and/or bolsters may be used herein to refer generally to any component, region or portion of a vehicle interior component, a seat assembly, vehicle seat, and/or chair) is formed by any one of the above techniques, including via method 1800.

In some embodiments, the vehicle interior component is a cushion (e.g., 80, 94, 98, 22, 124, and/or 170) for a vehicle seat and comprises two bolsters positioned on opposite sides of the cushion.

In some embodiments, a product is manufactured according to the above techniques, e.g. via method 1800.

In some embodiments, the contoured consolidated filament structure (e.g. 32, 59, 94, 98, and/or 253) forms a product. The method 1800 includes installing the product on a seat frame as a seat cushion.

In some embodiments, a seat assembly (e.g., seat assembly, seat, and/or chair) is manufactured according to the techniques described above, including via method 1800.

A product manufactured according to a method is described. The method includes dispensing a plurality of strands (e.g. 24, 52, 128, and/or 253) of a molten thermoplastic resin. In some embodiments, filaments or strands may be used herein to refer to the generally linear polymeric units (although they may be looped, fused or bonded together to form a mesh-like structure) after being dispensed through one or more orifices of the die plate or extrusion die (e.g., 18, 20, and/or 136).

The method includes shaping the plurality of strands as a contoured unitary mesh product (e.g., a consolidated filament structure, filament structure, mesh, extruded material, cushion blank, thermoplastic cushion, mesh cushion, seat cushion, and/or cushion) by applying a force onto the plurality of strands via one or more shaping assemblies (e.g. 254, 304), wherein the shaping assembly includes at least one of: one or more nozzles (e.g. 68 and/or 70), one or more shaping conveyors (e.g., 144, 146, and/or 148), and/or one or more actuator assemblies (e.g. 200, 202). In some embodiments, the nozzles (e.g. 68 and/or 70) may include fluid jets from nozzles in a single direction, or in at least two different directions that are opposite or not opposite to one another; nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid/gas. In some embodiments, the shaping conveyors (e.g., 144, 146, and/or 148) may include one or more conveyors with a track (e.g. 150 and/or 152) on the conveyor; the tracks may be links or a belt; the shaping tools (e.g. 156) may be connected to the tracks and are interchangeable; the shaping tools may form shapes, contour, and recesses (e.g. 158) in the product; the conveyors may be parallel; there may be four conveyors to surround product; and/or a cooling chamber, fluid bath, fluid chamber, or heat transfer chamber (e.g. 34, 56, 142, and/or 264) may be provided or a pair of spaced apart conveyors and an actuator (e.g. 168) to vary the spacing between the pair of conveyors to shape the product as the product conveyed, the conveyors may be parallel, the actuator (e.g. 168) may be a linear actuator, and/or a cooling chamber, fluid bath, fluid chamber, or heat transfer chamber (e.g. 34, 56, 142, and/or 264) may be provided.

In some embodiments, the method includes shaping the plurality of strands by actuating the one or more actuators (e.g., 202) of the one or more shaping assemblies to contact the plurality of strands (e.g. 24, 52, 128, and/or 253) thereby shaping the plurality of strands as a contoured unitary mesh product (e.g. 32, 59, 94, 98, and/or 253). In some embodiments, the actuators (e.g. 202) may include an array (e.g. 206) of actuators, and may include up to a first, second, third, and fourth array to surround the product, with each array at least partially submerged within the fluid bath; an optional elastic layer (e.g. 212) may be positioned between the actuator heads (e.g. 210) and the product; the actuators may be linear actuators, electro-mechanical actuators, pneumatic actuators, hydraulic actuators; a controller (e.g. 204) may be provided to control a distance that the actuator extends to shape the product, a time that the actuator is deployed to contact product, and/or control an actuator based on a feed rate of the product; each actuator may have a head (e.g. 210) at a distal end to shape the product; the head may be coated or formed from a rubber material; the head may have different shapes including curved or planar; the actuator array (e.g. 206) may have a row (e.g. 207) of actuators that is straight or curved or angled, and may contain any number of actuators; and/or each array may also have multiple layers (e.g. 208) of rows, e.g. rows stacked on one another in the direction of travel such that the product passes multiple layers of actuators.

In some embodiments, the method includes shaping the plurality of strands (e.g. 24, 52, 128, and/or 253) by conveying the plurality of strands via the one or more shaping conveyors (e.g., 144, 146, 148, 160, 162, 164, and/or 166) of the one or more shaping assemblies to contact the plurality of strands thereby shaping the plurality of strands as a contoured unitary mesh product (e.g. 32, 59, 94, 98, and/or 253). In some embodiments, the shaping conveyors (e.g., 144, 146, 148, 160, 162, 164, and/or 166) may include one or more conveyors with a track (e.g. 150 and/or 152) on the conveyor; the tracks may be links or a belt; the shaping tools (e.g. 156) may be connected to the tracks and interchangeable; the shaping tools form shapes, contour, and recesses (e.g. 158) in the product; the conveyors may be parallel; there may be four conveyors to surround product; a cooling chamber, fluid bath, fluid chamber, or heat transfer chamber (e.g. 34, 56, 142, and/or 264); a pair of spaced apart conveyors with an actuator (e.g. 168) to vary the spacing between the pair of conveyors to shape the product as the product conveyed, the conveyors may be parallel, the actuator (e.g. 168) may be a linear actuator, and/or a cooling chamber, fluid bath, fluid chamber, or heat transfer chamber (e.g. 34, 56, 142, and/or 264).

In some embodiments, the method includes shaping the plurality of strands by directing one or more fluid jets towards the plurality of strands (e.g. 24, 52, 128, and/or 253) via the one or more nozzles (e.g., 68 and/or 70) of the one or more shaping assemblies to contact the plurality of strands (e.g., 52) thereby shaping the plurality of strands as a contoured unitary mesh product. In some embodiments, the fluid jets from nozzles may be provided in a single direction, or in at least two different directions that are opposite or not opposite to one another; nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid/gas).

In some embodiments, the product (e.g. 24, 52, 128, and/or 253) includes a unitary non-woven cushion (e.g., 80, 94, 98, 122, 124, and/or 170; a consolidated filament structure, filament structure, mesh, extruded material, cushion blank, thermoplastic cushion, mesh cushion, seat cushion, and/or cushion).

An assembly is described. The assembly (e.g. 254) includes at least one of: (i) a first sub-assembly (e.g. 256), a (ii) a second sub-assembly (e.g. 258), (iii) a third sub-assembly (e.g. 260), and (iv) a fourth sub-assembly (e.g. 262).

The (i) first sub-assembly (e.g. 256) comprises a conveyor (e.g., 144, 146, 148, 160, 162, 164, and/or 166) to convey a product (e.g., a consolidated filament structure, filament structure, mesh, extruded material, cushion blank, thermoplastic cushion, mesh cushion, seat cushion, or cushion), and a plurality of shaping tools (e.g., 156) attached to the conveyor (e.g., 144, 146, 148, 160, 162, 164, and/or 166) to shape the product (e.g. 32, 59, 94, 98, and/or 253) as the product is conveyed along the conveyor. In some embodiments, the conveyors (e.g., 144, 146, 148, 160, 162, 164, and/or 166) may be, e.g., one or more conveyors with a track on the conveyor, where the tracks may be links or a belt; the shaping tools (e.g. 156) may be connected to the tracks and are interchangeable; where the shaping tools may form shapes, contour, and recesses (e.g. 158) in the product; the conveyors may be parallel; there may be four conveyors to surround product; and/or a cooling chamber, fluid bath, fluid chamber, or heat transfer chamber may be provided.

The (ii) second sub-assembly (e.g. 258) comprises a pair of spaced apart conveyors (e.g., 164 and/or 166) to convey the product (e.g. 32, 59, 94, 98, and/or 253) therebetween, and an actuator (e.g. 168) in cooperation with the pair of conveyors to vary the spacing between the pair of conveyors to shape the product as the product conveyed. In some embodiments, a pair of spaced apart conveyors and an actuator (e.g. 168) may vary the spacing between the pair of conveyors to shape the product as the product conveyed; the conveyors may be parallel, the actuator (e.g. 168) may be a linear actuator; and/or a cooling chamber, fluid bath, fluid chamber, or heat transfer chamber (e.g. 34, 56, 142, and/or 264) may also be provided.

The (iii) third sub-assembly (e.g. 200, 260) comprises an actuator array (e.g. 206) comprising one or more actuators (e.g., 202), each actuator deployable to contact the product (e.g. 32, 59, 94, 98, and/or 253), and a controller (e.g. 204) configured to control a position of each actuator to contact and shape the product as the product is moved past the actuator array. In some embodiments, the third sub-assembly may be an array (e.g. 206) of actuators (e.g. 202), and may include up to a first, second, third, and fourth array to surround product, with each array at least partially submerged within the fluid bath (e.g. 34, 56, 142, and/or 264); an optional elastic layer (e.g. 212) may be positioned between the actuator heads (e.g. 210) and the product; the actuators (e.g. 202) may be linear actuators, electro-mechanical actuators, pneumatic actuators, hydraulic actuators; the controller (e.g. 204) may be provided to control distance that the actuator extends to shape the product, the time that the actuator is deployed to contact product, and/or control an actuator based on a feed rate of the product; each actuator (e.g. 202) may have a head (e.g. 21) at a distal end to shape the product, and the head may be coated or formed from a rubber material; the head (e.g. 210) may have different shapes including curved or planar; the actuator array (e.g. 206) may have a row (e.g. 207) of actuators (e.g. 202) that is straight or curved or angled, and contain any number of actuators; and/or each array (e.g. 206) may also have multiple layers (e.g. 208) of rows (e.g. 207), e.g. rows stacked on one another in the direction of travel such that the product passes multiple layers of actuators.

The (iv) fourth sub-assembly (e.g. 262) comprises one or more nozzles (e.g. 68 and/or 70) positioned to direct fluid towards the product (e.g. 32, 59, 94, 98, and/or 253) to shape the product as the product is moved past the one or more nozzles. In some embodiments, the nozzles may be used to shape product (e.g. 32, 59, 94, 98, and/or 253) in the fluid bath (e.g. 34, 56, 142, and/or 264), and the nozzles may have fluid streams in a single direction, or in at least two different directions that are opposite or not opposite to one another; the nozzles may be divergent with an exit opening that is larger than the inlet and/or convergent with an exit opening that is smaller than the inlet; and/or a pump may be used to provide fluid to the nozzles from either the fluid bath (e.g. 34, 56, 142, and/or 264) or as another fluid/gas.

In some embodiments, the assembly (e.g. 254) further includes the first sub-assembly (e.g., 256, one or more conveyors (e.g., 144, 146, 148, 160, 162, 164, and/or 166) with a track (e.g. 150, 152) on the conveyor, and where the tracks may be links or a belt; the shaping tools (e.g. 156) may be connected to the tracks and are interchangeable; the shaping tools may form shapes, contour, and recesses (e.g. 158) in the product; the conveyors may be parallel; there may be four conveyors to surround product; and/or a cooling chamber, fluid bath, fluid chamber, or heat transfer chamber (e.g. 34, 56, 142, and/or 264) may be also be provided).

In some embodiments, the assembly (e.g. 254) further includes a second conveyor (e.g., 144, 146, 148, 160, 162, 164, and/or 166) to convey the product (e.g. 32, 59, 94, 98, and/or 253), the second conveyor spaced apart from the first conveyor to convey the product between the first conveyor and the second conveyor (e.g., two conveyors, each may have shaping tools 156 on tracks 152).

In some embodiments, the assembly (e.g. 254) further includes a second plurality of shaping tools (e.g., 156) attached to the second conveyor (e.g., 144, 146, 148, 160, 162, 164, and/or 166) to shape the product (e.g. 32, 59, 94, 98, and/or 253) as the product is conveyed along the first conveyor and the second conveyor.

In some embodiments, the assembly (e.g. 254) further includes a cooling chamber (e.g. 34, 56, 142, and/or 264) to cool the product (e.g. 24, 52, 128, and/or 253) while the product is conveyed and shaped (e.g., a fluid bath, fluid chamber, heat transfer chamber).

A system is described. The system (e.g. 250) comprises a dispenser (e.g. 252) of a plurality of strands (e.g. 24, 52, 128, and/or 253) of molten thermoplastic resin and the assembly 254 as described above, oriented relative to the dispenser 252 to receive, convey, and shape the plurality of strands.

In some embodiments, the assembly (e.g. 254) further includes the second sub-assembly (e.g., 258, 164 and/or 166) (e.g., a pair of spaced apart conveyors and an actuator (e.g. 168) to vary the spacing between the pair of conveyors to shape the product (e.g. 24, 52, 128, and/or 253) as the product conveyed, the conveyors may be parallel, and/or the actuator may be a linear actuator).

In some embodiments, the assembly (e.g. 250) further includes a cooling chamber (e.g. 34, 56, 142, and/or 264) to cool the product (e.g. 32, 59, 94, 98, and/or 253) while the product is conveyed and shaped (e.g., a fluid bath, fluid chamber, and/or heat transfer chamber).

A system is described. The system (e.g. 250) includes a dispenser (e.g. 252) of a plurality of strands (e.g. 24, 52, 128, and/or 253) of molten thermoplastic resin and an assembly (e.g. 254), oriented relative to the dispenser (e.g. 252) to receive, convey, and shape the plurality of strands.

In some embodiments, the assembly (e.g. 250) further includes the third sub-assembly (e.g., 200, 260, and/or an array 206 of actuators 202, which may include up to a first, second, third, and fourth array to surround product (e.g. 32, 59, 94, 98, and/or 253), with each array 106 at least partially submerged within the fluid bath (e.g. 34, 56, 142, and/or 264); and an optional elastic layer 212 may positioned between the actuator heads 210 and the product). In some embodiments, the actuators 202 may be linear actuators, electro-mechanical actuators, pneumatic actuators, hydraulic actuators. In some embodiments, a controller 204 may be provided to control a distance that an actuator 202 extends to shape the product (e.g. 32, 59, 94, 98, and/or 253), the time that the actuator 202 is deployed to contact product (e.g. 32, 59, 94, 98, and/or 253), and/or control an actuator 202 based on a feed rate of the product (e.g. 32, 59, 94, 98, and/or 253). In some embodiments, each actuator 202 may be provided with a head (e.g. 210) at a distal end to shape the product (e.g. 32, 59, 94, 98, and/or 253), where the head 210 may be coated or formed from a rubber material; the head (e.g. 210) may have different shapes including curved or planar. In some embodiments, the actuator array (e.g. 206) may have a row (e.g. 207) of actuators that is straight or curved or angled, and may contain any number of actuators; and/or each array (e.g. 206) may also have multiple layers (e.g. 208) of rows (e.g. 207), e.g. rows stacked on one another in the direction of travel such that the product (e.g. 32, 59, 94, 98, and/or 253) passes multiple layers of actuators (e.g. 202).

In some embodiments, the assembly (e.g. 250) further includes a second actuator array (e.g., 206) comprising one or more second actuators (e.g. 202), each second actuator deployable to contact the product (e.g. 32, 59, 94, 98, and/or 253), the second actuator array (e.g. 206) spaced apart from the first actuator array (e.g. 206) such that the product is conveyed therebetween. In some embodiments, the controller (e.g. 204) may be further configured to control a position of each second actuator (e.g. 202) to contact and shape the product (e.g. 32, 59, 94, 98, and/or 253) as the product is moved past the second actuator array (e.g., array on second side, may be opposite to the first array).

In some embodiments, the assembly (e.g. 250) further includes a third actuator array (e.g. 206) comprising one or more third actuators (e.g. 202), each third actuator deployable to contact the product (e.g. 32, 59, 94, 98, and/or 253), the third actuator array spaced apart from the first and second actuator arrays (e.g. 206) such that the product is conveyed therebetween. In some embodiments, the controller 204 may be further configured to control a position of each third actuator 202 to contact and shape the product (e.g. 32, 59, 94, 98, and/or 253) as the product is moved past the third actuator array (e.g., array on third side).

In some embodiments, the assembly (e.g. 250) further includes a fourth actuator array (e.g. 206) comprising one or more fourth actuators (e.g. 202), each fourth actuator deployable to contact the product (e.g. 32, 59, 94, 98, and/or 253), the fourth actuator array spaced apart from the first, second, and third actuator arrays (e.g. 206) such that the product is conveyed therebetween. In some embodiments, the controller (e.g. 204) may be further configured to control a position of each fourth actuator (e.g. 202) to contact and shape the product (e.g. 32, 59, 94, 98, and/or 253) as the product is moved past the fourth actuator array (e.g., array on fourth side).

In some embodiments, the first, second, third, and fourth actuator arrays (e.g. 206_ are positioned to surround the product (e.g. 32, 59, 94, 98, and/or 253) (e.g., with actuator arrays on all four sides of the product as it descends into bath).

In some embodiments, the assembly (e.g. 250) further includes a fluid chamber to cool the product (e.g. 32, 59, 94, 98, and/or 253) while the product is shaped (e.g., fluid bath, with the actuators at least partially submerged within bath to contact product in the bath).

In some embodiments, the assembly (e.g. 250) further includes a flexible layer (e.g. 212) positioned between at least one of the actuators (e.g., 202) and the product (e.g. 32, 59, 94, 98, and/or 253) (e.g., an elastic layer is positioned between the actuator heads and the product).

In some embodiments, the controller (e.g. 204) is further configured to control a stroke distance of at least one of the actuators (e.g., 202) to shape the product (e.g., by controlling a distance that the actuator extends to shape the product).

In some embodiments, the controller (e.g. 204) is further configured to control an actuation time of at least one of the actuators (e.g., 202) to shape the product (e.g. 32, 59, 94, 98, and/or 253) (e.g., by controlling a time that the actuator is deployed to contact product).

In some embodiments, the controller (e.g. 204) is further configured to receive a signal indicative of a feed rate of the product (e.g. 32, 59, 94, 98, and/or 253), and control at least one of the actuators (e.g., 202) based on the signal.

In some embodiments, each actuator (e.g., 202) comprises a linear actuator.

In some embodiments, each actuator (e.g. 202) comprises a head (e.g. 210) (e.g., with the head at a distal end of the actuator to contact product (e.g. 32, 59, 94, 98, and/or 253), and may be coated or formed from a rubber material, different shapes including curved or planar).

In some embodiments, each head (e.g. 210) of an actuator (e.g. 202) comprises rubber.

In some embodiments, each actuator array (e.g. 206) comprises a row (e.g. 207) of a plurality of actuators (e.g. 202) (e.g., a row may be straight or curved, and contain any number of actuators).

In some embodiments, each actuator array (e.g., 206) comprises one or more layers (e.g. 208) of rows (e.g. 207).

In some embodiments, the layers (e.g. 208) of rows (e.g. 207) are positioned to be stacked in a direction of travel for the product (e.g. 32, 59, 94, 98, and/or 253) (e.g., product passes multiple layers of actuators as it travels).

A system is described. The system (e.g. 250) includes a dispenser (e.g. 252) of a plurality of strands (e.g. 24, 52, 128, and/or 253) of molten thermoplastic resin and an assembly (e.g. 254), oriented relative to the dispenser (e.g. 252) to receive, and shape the plurality of strands (e.g. 24, 52, 128, and/or 253) as they pass therethrough.

In some embodiments, the assembly (e.g. 254) includes the fourth sub-assembly (e.g., 262, nozzles (e.g. 68 and/or 70) with fluid streams in a single direction, and/or in at least two different directions that are opposite or not opposite to one another). In some embodiments, the nozzles (e.g. 68 and/or 70) may be divergent with an exit opening that is larger than the inlet and/or convergent with an exit opening that is smaller than the inlet. In some embodiments, a pump may be used to provide fluid to the nozzles (e.g. 68 and/or 70) from either the fluid bath (e.g. 34, 56, 142, and/or 264) or as another fluid/gas.

In some embodiments, the nozzles (e.g. 68 and/or 70) are oriented to direct fluid streams towards the product (e.g. 32, 59, 94, 98, and/or 253) in a single direction.

In some embodiments, the nozzles (e.g. 68 and/or 70) are oriented to direct fluid streams towards the product (e.g. 32, 59, 94, 98, and/or 253) in at least two different directions (e.g., directions that are opposite or not opposite to one another).

In some embodiments, at least one nozzle (e.g. 68 and/or 70) of the one or more nozzles is a divergent nozzle (e.g., where divergent is an exit opening that is larger than the inlet).

In some embodiments, at least one nozzle (e.g. 68 and/or 70) of the one or more nozzles is a convergent nozzle (e.g., where convergent is an exit opening that is smaller than the inlet).

In some embodiments, at least one nozzle (e.g. 68 and/or 70) of the one or more nozzles is a divergent nozzle and at least another nozzle (e.g. 68 and/or 70) of the one or more nozzles is a convergent nozzle.

In some embodiments, the assembly (e.g. 254) further includes a pump fluidly connected to the one or more nozzles (e.g., 68 and/or 70) (e.g., the pump may be used to pump fluid from the bath (e.g. 34, 56, 142, and/or 264) or pump another liquid/gas, including air).

In some embodiments, a system (e.g. 250) is described. The system (e.g. 250) includes a dispenser (e.g. 252) of a plurality of strands (e.g. 24, 52, 128, and/or 253) of molten thermoplastic resin and an assembly (e.g. 254) as described above, oriented relative to the dispenser (e.g. 252) to receive, and shape the plurality of strands (e.g. 24, 52, 128, and/or 253) as they pass therethrough.

In some embodiments, a system (e.g. 250) is described. The system (e.g. 250) includes a dispenser (e.g. 252) of a plurality of strands (e.g. 24, 52, 128, and/or 253) of molten thermoplastic resin, a fluid bath (e.g. 34, 56, 142, and/or 264), and an assembly (e.g. 254) as described above, wherein the assembly (e.g. 254) is at least partially submerged within the fluid bath. In some embodiments, filaments or strands (e.g. 24, 52, 128, and/or 253) may be used herein to refer to the generally linear polymeric units (although they may be looped, fused or bonded together to form a mesh-like structure) after being dispensed through one or more orifices of the die plate or extrusion die of the extruder (e.g. 16 and/or 134).

Clause 1. A method, in combination with, or without, any one or more of the successive clauses, comprising dispensing a plurality of strands of a molten polymeric material, and applying a force on the plurality of strands via one or more shaping assemblies thereby shaping the plurality of strands as a contoured consolidated filament structure.

Clause 1A. A method, in combination with, or without, any one or more of the successive clauses, comprising dispensing a plurality of strands of a molten polymeric material, and applying a force on the plurality of strands via one or more shaping assemblies.

Clause 2. The method of any of the preceding or successive clauses wherein the shaping assembly comprises at least one of: one or more nozzles, one or more shaping conveyors, or one or more actuator assemblies.

Clause 3. The method of any of the preceding or successive clauses wherein the method further comprises at least one of: directing one or more fluid jets from the one or more nozzles thereby applying the force on the plurality of strands, conveying the plurality of strands along the one or more shaping conveyors thereby applying the force on the plurality of strands, or actuating one or more actuators to contact the plurality of strands thereby applying the force on the plurality of strands.

Clause 4. The method of any of the preceding or successive clauses further comprising moving the plurality of strands through a fluid bath; and applying the force on the plurality of strands via the one or more shaping assemblies while the plurality of strands is at least partially submerged in the fluid bath.

Clause 5. The method of any of the preceding or successive clauses further comprising cooling the plurality of strands within the fluid bath.

Clause 6. The method of any of the preceding or successive clauses further comprising cutting the contoured consolidated filament structure to form at least one of a vehicle interior component or a unitary non-woven cushion.

Clause 7. The method of any of the preceding or successive clauses further comprising: heating a polymeric material to a molten state, such that it becomes the molten polymer, and introducing the molten polymer into a die plate having a plurality of holes disposed therethrough such that the molten polymer moves through the holes and forms the plurality of strands as molten polymeric filaments, and introducing the molten polymeric filaments into a bath to cool the molten polymeric filaments, and applying a fluid stream to the molten polymeric filaments via the one or more shaping assemblies to apply the force after the molten polymeric filaments are introduced into the bath such that the molten polymeric filaments are imparted with a desired shape and the consolidated filament structure having the desired shape is formed.

Clause 8. The method of any of the preceding or successive clauses, wherein the bath contains a liquid, and the fluid stream comprises the liquid.

Clause 9. The method of any of the preceding or successive clauses, wherein applying the fluid stream to the molten polymeric filaments comprises moving the fluid stream through a nozzle before it contacts the molten polymeric filaments.

Clause 10. The method of any of the preceding or successive clauses, wherein the nozzle is positioned 10-15 mm from a surface of the molten polymeric filaments.

Clause 11. The method of any of the preceding or successive clauses, further comprising applying a plurality of the fluid streams to the molten polymeric filaments after the molten polymeric filaments are introduced into the bath.

Clause 12. The method of any of the preceding or successive clauses, wherein the fluid streams are applied to the molten polymeric filaments in a single direction.

Clause 13. The method of any of the preceding or successive clauses, wherein the fluid streams are applied to the molten polymeric filaments in at least two different directions.

Clause 14. The method of any of the preceding or successive clauses further comprising: heating a polymeric material to a molten state to create the molten polymeric material, extruding the molten polymeric material to form a plurality of molten polymeric filaments as the plurality of strands, cooling the molten polymeric material in a fluid bath to create a consolidated filament structure, and applying a fluid stream to apply the force to the molten polymeric filaments in the fluid bath via the one or more shaping assemblies such that the consolidated filament structure has a desired shape as the contoured consolidated filament structure.

Clause 15. The method of any of the preceding or successive clauses, wherein the consolidated filament structure is a cushion blank for a vehicle seat, and the desired shape includes two bolsters positioned on opposite sides of the cushion blank.

Clause 16. The method of any of the preceding or successive clauses, further comprising applying a plurality of the fluid streams to the molten polymeric filaments in the fluid bath in at least one direction.

Clause 17. The method of any of the preceding or successive clauses, wherein at least one of the fluid streams is applied through a nozzle.

Clause 18. The method of any of the preceding or successive clauses, wherein the nozzle is a divergent nozzle.

Clause 19. The method of any of the preceding or successive clauses, wherein each of the fluid streams is applied to the molten polymeric filaments through a respective nozzle.

Clause 20. The method of any of the preceding or successive clauses, wherein at least one of the nozzles is a convergent nozzle.

Clause 21. The method of any of the preceding or successive clauses, wherein the fluid bath contains a liquid, and the fluid stream comprises the liquid.

Clause 22. The method of any of the preceding or successive clauses further comprising: heating a polymeric material to create a molten polymeric material;

forming a plurality of molten polymeric filaments as the plurality of strands from the molten polymeric material; cooling the molten polymeric material in a fluid bath; and directing a fluid stream at the molten polymeric material in the fluid bath to apply the force via the one or more shaping assemblies such that the molten polymer obtains a desired shape.

Clause 23. The method of any of the preceding or successive clauses, wherein cooling the molten polymer in the fluid bath forms a consolidated filament structure, and directing the fluid stream at the molten polymer in the fluid bath imparts the desired shape to the consolidated filament structure as the contoured consolidated filament structure.

Clause 24. The method of any of the preceding or successive clauses, further comprising directing a plurality of the fluid streams at the molten polymeric material in the fluid bath in at least one direction.

Clause 25. The method of any of the preceding or successive clauses, wherein the consolidated filament structure is a cushion blank for a vehicle seat, and the desired shape includes two bolsters positioned on opposite sides of the cushion blank.

Clause 26. The method of any of the preceding or successive clauses wherein the molten polymeric material is a molten thermoplastic resin, and the contoured consolidated filament structure is a contoured unitary mesh product; wherein the method further comprises: conveying the plurality of strands along at least one shaping conveyor of the one or more shaping assemblies while applying the force and shaping the plurality of strands as the contoured unitary mesh product.

Clause 27. The method of any of the preceding or successive clauses, further comprising conveying the plurality of strands within a plurality of shaping conveyors as the contoured unitary mesh product.

Clause 28. The method of any of the preceding or successive clauses, further comprising translating at least one of the plurality of shaping conveyors to vary a spacing between the plurality of shaping conveyors while conveying and shaping the plurality of strands.

Clause 29. The method of any of the preceding or successive clauses, further comprising shaping the plurality of strands with at least one shaping tool attached to the at least one shaping conveyor.

Clause 30. The method of any of the preceding or successive clauses, further comprising resisting a flow of the plurality of strands, thereby buckling the plurality of strands, the buckled strands intersecting as a unitary non-woven body.

Clause 31. The method of any of the preceding or successive clauses, further comprising cooling the plurality of strands to bond as the contoured unitary mesh product.

Clause 32. The method of any of the preceding or successive clauses, further comprising cooling the plurality of strands while shaping the plurality of strands.

Clause 33. The method of any of the preceding or successive clauses, further comprising cooling the plurality of strands in a cooling chamber.

Clause 34. The method of any of the preceding or successive clauses, wherein the molten polymeric material is a molten thermoplastic resin, and the contoured consolidated filament structure is a contoured unitary mesh product; wherein the method further comprises: actuating one or more actuators of the one or more shaping assemblies to contact the plurality of strands thereby applying the force and shaping the plurality of strands as the contoured unitary mesh product.

Clause 35. The method of any of the preceding or successive clauses, further comprising conveying the plurality of strands past the one or more actuators as the contoured unitary mesh product.

Clause 36. The method of any of the preceding or successive clauses, further comprising actuating a first actuator of the one or more actuators and a second actuator of the one or more actuators opposite to the first actuator to vary a spacing therebetween while shaping the plurality of strands.

Clause 37. The method of any of the preceding or successive clauses, further comprising resisting a flow of the plurality of strands, thereby buckling the plurality of strands, the buckled strands intersecting as a unitary non-woven body.

Clause 38. The method of any of the preceding or successive clauses, further comprising cooling the plurality of strands to bond as the contoured unitary mesh product.

Clause 39. The method of any of the preceding or successive clauses, further comprising cooling the plurality of strands while shaping the plurality of strands.

Clause 40. The method of any of the preceding or successive clauses, further comprising cooling the plurality of strands in a fluid chamber.

Clause 41. A vehicle interior component formed by the method of any of the preceding or successive clauses.

Clause 42. The vehicle interior component of clause 41 wherein the vehicle interior component is a cushion for a vehicle seat and comprises two bolsters positioned on opposite sides of the cushion.

Clause 43. A product manufactured according to the method of any of the preceding or successive clauses.

Clause 44. The method of any of the preceding or successive clauses, wherein the contoured consolidated filament structure forms a product; and wherein the method further comprises installing the product on a seat frame as a seat cushion.

Clause 45. A seat assembly manufactured according to the method of any of the preceding or successive clauses.

Clause 46. A product manufactured according to a method in combination with, or without, any one or more of the successive clauses, comprising dispensing a plurality of strands of a molten thermoplastic resin; and shaping the plurality of strands as a contoured unitary mesh product by applying a force onto the plurality of strands via one or more shaping assemblies, wherein the shaping assembly comprises at least one of: one or more nozzles, one or more shaping conveyors, and/or one or more actuator assemblies.

Clause 47. The product of any of the preceding or successive clauses, wherein the method further comprises shaping the plurality of strands by actuating the one or more actuators of the one or more shaping assemblies to contact the plurality of strands thereby shaping the plurality of strands as a contoured unitary mesh product.

Clause 48. The product of any of the preceding or successive clauses, wherein the method further comprises shaping the plurality of strands by conveying the plurality of strands via the one or more shaping conveyors of the one or more shaping assemblies to contact the plurality of strands thereby shaping the plurality of strands as a contoured unitary mesh product.

Clause 49. The product of any of the preceding or successive clauses wherein the method further comprises shaping the plurality of strands by directing one or more fluid jets towards the plurality of strands via the one or more nozzles of the one or more shaping assemblies to contact the plurality of strands thereby shaping the plurality of strands as a contoured unitary mesh product.

Clause 50. The product of any of the preceding or successive clauses, further comprising a unitary non-woven cushion.

Clause 51. An assembly in combination with, or without, any one or more of the successive clauses, comprising at least one of: (i) a first sub-assembly comprising: a conveyor to convey a product, and a plurality of shaping tools attached to the conveyor to shape the product as the product is conveyed along the conveyor; (ii) a second sub-assembly comprising: a pair of spaced apart conveyors to convey the product therebetween, and an actuator in cooperation with the pair of conveyors to vary the spacing between the pair of conveyors to shape the product as the product conveyed; (iii) a third sub-assembly comprising: an actuator array comprising one or more actuators, each actuator deployable to contact the product, and a controller configured to control a position of each actuator to contact and shape the product as the product is moved past the actuator array; and/or (iv) a fourth sub-assembly comprising one or more nozzles positioned to direct fluid towards the product to shape the product as the product is moved past the one or more nozzles.

Clause 52. The assembly of any of the preceding or successive clauses further comprising the first sub-assembly.

Clause 53. The assembly of any of the preceding or successive clauses, further comprising a second conveyor to convey the product, the second conveyor spaced apart from the first conveyor to convey the product between the first conveyor and the second conveyor.

Clause 54. The assembly of any of the preceding or successive clauses, further comprising a second plurality of shaping tools attached to the second conveyor to shape the product as the product is conveyed along the first conveyor and the second conveyor.

Clause 55. The assembly of any of the preceding or successive clauses, further comprising a cooling chamber to cool the product while the product is conveyed and shaped.

Clause 56. A system comprising: a dispenser of a plurality of strands of molten thermoplastic resin; and the assembly of any of the preceding or successive clauses, oriented relative to the dispenser to receive, convey, and shape the plurality of strands.

Clause 57. The assembly of any of the preceding or successive clauses further comprising the second sub-assembly.

Clause 58. The assembly of any of the preceding or successive clauses, further comprising a cooling chamber to cool the product while the product is conveyed and shaped.

Clause 59. A system comprising: a dispenser of a plurality of strands of molten thermoplastic resin; and the assembly of any of the preceding or successive clauses, oriented relative to the dispenser to receive, convey, and shape the plurality of strands.

Clause 60. The assembly of any of the preceding or successive clauses further comprising the third sub-assembly.

Clause 61. The assembly of any of the preceding or successive clauses further comprising a second actuator array comprising one or more second actuators, each second actuator deployable to contact the product, the second actuator array spaced apart from the first actuator array such that the product is conveyed therebetween; wherein the controller is further configured to control a position of each second actuator to contact and shape the product as the product is moved past the second actuator array.

Clause 62. The assembly of any of the preceding or successive clauses, further comprising a third actuator array comprising one or more third actuators, each third actuator deployable to contact the product, the third actuator array spaced apart from the first and second actuator arrays such that the product is conveyed therebetween; wherein the controller is further configured to control a position of each third actuator to contact and shape the product as the product is moved past the third actuator array.

Clause 63. The assembly of any of the preceding or successive clauses, further comprising a fourth actuator array comprising one or more fourth actuators, each fourth actuator deployable to contact the product, the fourth actuator array spaced apart from the first, second, and third actuator arrays such that the product is conveyed therebetween; wherein the controller is further configured to control a position of each fourth actuator to contact and shape the product as the product is moved past the fourth actuator array.

Clause 64. The assembly of any of the preceding or successive clauses wherein the first, second, third, and fourth actuator arrays are positioned to surround the product.

Clause 65. The assembly of any of the preceding or successive clauses, further comprising a fluid chamber to cool the product while the product is shaped.

Clause 66. The assembly of any of the preceding or successive clauses further comprising a flexible layer positioned between at least one of the actuators and the product.

Clause 67. The assembly of any of the preceding or successive clauses wherein the controller is further configured to control a stroke distance of at least one of the actuators to shape the product.

Clause 68. The assembly of any of the preceding or successive clauses wherein the controller is further configured to control an actuation time of at least one of the actuators to shape the product.

Clause 69. The assembly of any of the preceding or successive clauses wherein the controller is further configured to receive a signal indicative of a feed rate of the product, and control at least one of the actuators based on the signal.

Clause 70. The assembly of any of the preceding or successive clauses wherein each actuator comprises a linear actuator.

Clause 71. The assembly of any of the preceding or successive clauses wherein each actuator comprises a head.

Clause 72. The assembly of any of the preceding or successive clauses wherein each head of an actuator comprises rubber.

Clause 73. The assembly of any of the preceding or successive clauses wherein each actuator array comprises a row of a plurality of actuators.

Clause 74. The assembly of any of the preceding or successive clauses wherein each actuator array comprises one or more layers of rows.

Clause 75. The assembly of any of the preceding or successive clauses wherein the layers of rows are positioned to be stacked in a direction of travel for the product.

Clause 76. A system comprising: a dispenser of a plurality of strands of molten thermoplastic resin; and the assembly of any of the preceding or successive clauses, oriented relative to the dispenser to receive, and shape the plurality of strands as they pass therethrough.

Clause 77. The assembly of any of the preceding or successive clauses further comprising the fourth sub-assembly.

Clause 78. The assembly of any of the preceding or successive clauses wherein the nozzles are oriented to direct fluid streams towards the product in a single direction.

Clause 79. The assembly of any of the preceding or successive clauses wherein the nozzles are oriented to direct fluid streams towards the product in at least two different directions.

Clause 80. The assembly of any of the preceding or successive clauses wherein at least one nozzle of the one or more nozzles is a divergent nozzle.

Clause 81. The assembly of any of the preceding or successive clauses wherein at least one nozzle of the one or more nozzles is a convergent nozzle.

Clause 82. The assembly of any of the preceding or successive clauses wherein at least one nozzle of the one or more nozzles is a divergent nozzles, and at least another nozzle of the one or more nozzles is a convergent nozzle.

Clause 83. The assembly of any of the preceding or successive clauses further comprising a pump fluidly connected to the one or more nozzles.

Clause 84. A system comprising: a dispenser of a plurality of strands of molten thermoplastic resin; and the assembly of any of the preceding or successive clauses, oriented relative to the dispenser to receive, and shape the plurality of strands as they pass therethrough.

Clause 85. A system comprising: a dispenser of a plurality of strands of molten thermoplastic resin; a fluid bath; and the assembly of any of the preceding clauses, wherein the assembly is at least partially submerged within the fluid bath.

Clause 86. Any one of the preceding clauses 1-85 in any combination.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method comprising:
dispensing a plurality of strands of a molten polymeric material;
applying a force on the plurality of strands via one or more shaping assemblies comprising one or more nozzles that direct one or more fluid jets on the plurality of strands to form a contoured consolidated filament structure; and cutting the contoured consolidated filament structure to form at least one of a vehicle interior component or a unitary non-woven cushion.

2. The method of claim 1, wherein the one or more shaping assemblies comprise at least one of: one or more shaping conveyors or one or more actuator assemblies.

3. The method of claim 2, wherein the method further comprises at least one of:

conveying the plurality of strands along the one or more shaping conveyors, thereby applying force on the plurality of strands, or actuating one or more actuators, corresponding to at least one of the one or more actuator assemblies, to contact the plurality of strands, thereby applying force on the of strands.

4. The method of claim 1, further comprising:

moving the plurality of strands through a fluid bath; and applying the force on the plurality of strands via the one or more shaping assemblies while the plurality of strands is at least partially submerged in the fluid bath.

5. The method of claim 4, further comprising cooling the plurality of strands within the fluid bath.

6. The method of claim 1, wherein the molten polymeric material is a molten thermoplastic resin, and the contoured consolidated filament structure is a contoured unitary mesh product, and wherein the method further comprises:

conveying the plurality of strands along at least one shaping conveyor of the one or more shaping assemblies while applying the force and shaping the plurality of strands as the contoured unitary mesh product.

7. The method of claim 6, further comprising conveying the plurality of strands within a plurality of shaping conveyors as the contoured unitary mesh product.

8. The method of claim 7, further comprising translating at least one of the plurality of shaping conveyors to vary a spacing between the plurality of shaping conveyors while conveying and shaping the plurality of strands.

9. The method of claim 6, further comprising shaping the plurality of strands with at least one shaping tool detachably attached to the at least one shaping conveyor.

10. The method of claim 6, further comprising resisting a flow of the plurality of strands, thereby buckling the plurality of strands, the buckled strands intersecting as a unitary non-woven body.

11. The method of claim 6, further comprising cooling the plurality of strands to bond as the contoured unitary mesh product.

12. The method of claim 6, further comprising cooling the plurality of strands while shaping the plurality of strands.

13. The method of claim 6, further comprising cooling the plurality of strands in a cooling chamber.

14. The method of claim 1, wherein the contoured consolidated filament structure forms a product, and wherein the method further comprises installing the product on a seat frame as a seat cushion.

15. The method of claim 1, wherein:

the plurality of strands is bent and looped such that each strand contacts and bonds to at least one other strand of the plurality of strands, thereby forming a consolidated filament structure, and the one or more fluid jets contact the plurality of strands within the consolidated filament structure forming at least one indentation or at least one channel in the consolidated filament structure, thereby shaping into the contoured consolidated filament structure.

16. The method of claim 1, wherein the one or more nozzles direct the one or more fluid jets on the plurality of strands in one of: a single direction or in at least two or more distinct directions.

\* \* \* \* \*